(12) United States Patent
Fairchild et al.

(10) Patent No.: US 6,654,517 B2
(45) Date of Patent: Nov. 25, 2003

(54) OPTICAL DEVICES ENGAGED TO FIBERS WITH ANGLE-POLISHED FACETS

(75) Inventors: Scot C. Fairchild, Santa Clara, CA (US); Warren Dalziel, Monte Sereno, CA (US); Roger A. Hajjar, San Jose, CA (US); Tom Schwartz, Scotts Valley, CA (US)

(73) Assignee: Vitesse Semiconductor Corporation, San Jose, CA (US)

(*) Notice: Subject to any disclaimer, the term of this patent is extended or adjusted under 35 U.S.C. 154(b) by 0 days.

(21) Appl. No.: 09/832,285

(22) Filed: Apr. 9, 2001

(65) Prior Publication Data

US 2002/0114566 A1 Aug. 22, 2002

Related U.S. Application Data

(60) Provisional application No. 60/270,487, filed on Feb. 21, 2001, and provisional application No. 60/275,254, filed on Mar. 12, 2001.

(51) Int. Cl.[7] .............. G02B 6/32; G02B 6/36; G02B 6/26; G02B 6/42
(52) U.S. Cl. .............. 385/33; 385/16; 385/18; 385/93
(58) Field of Search .............. 385/88–94, 16–19, 385/33

(56) References Cited

U.S. PATENT DOCUMENTS

| | | | | |
|---|---|---|---|---|
| 5,074,682 A | * | 12/1991 | Uno et al. | 385/93 |
| 5,875,271 A | * | 2/1999 | Laughlin | 385/16 |
| 5,883,748 A | * | 3/1999 | Shum | 359/819 |
| 6,097,860 A | * | 8/2000 | Laor | 385/17 |
| 6,179,483 B1 | * | 1/2001 | Kanazawa | 385/93 |
| 6,192,174 B1 | * | 2/2001 | Lee | 385/24 |
| 6,364,543 B1 | * | 4/2002 | Fairchild | 385/92 |
| 2002/0051603 A1 | * | 5/2002 | Hajjar et al. | 385/24 |

* cited by examiner

*Primary Examiner*—Brian Healy
*Assistant Examiner*—Kevin S Wood
(74) *Attorney, Agent, or Firm*—Fish & Richardson P.C.

(57) ABSTRACT

Techniques and devices for using fibers that are angle-polished to reduce the adverse effects of optical reflection. Each fiber is mounted so that the longitudinal direction of the fiber core forms an angle with respect to an optical axis of a device along which an optical beam is coupled to or from the angle-polished end facet of the fiber.

48 Claims, 23 Drawing Sheets

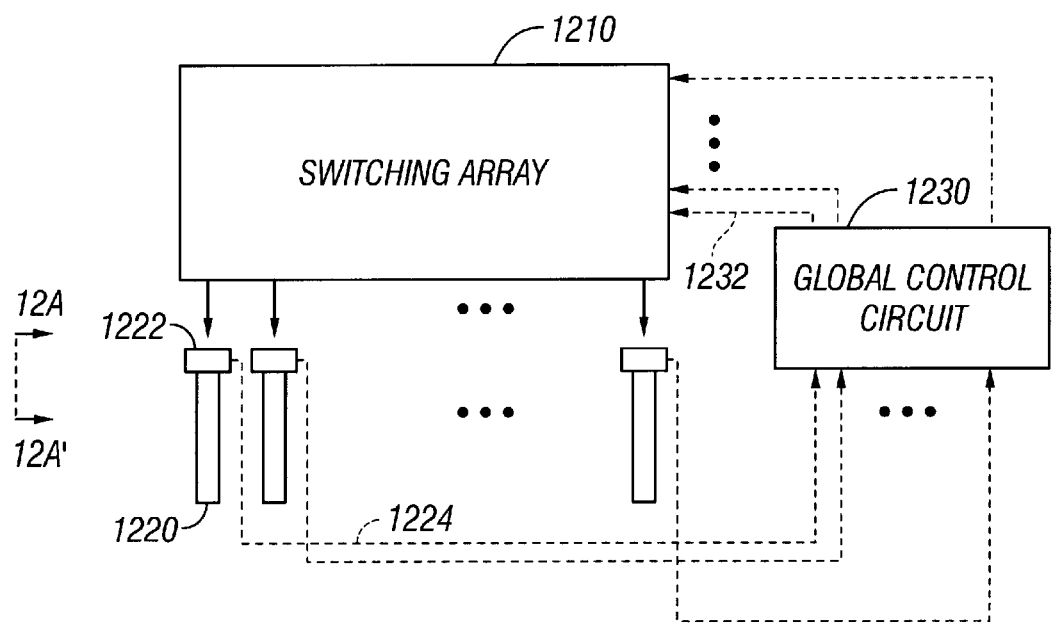
FIG. 12
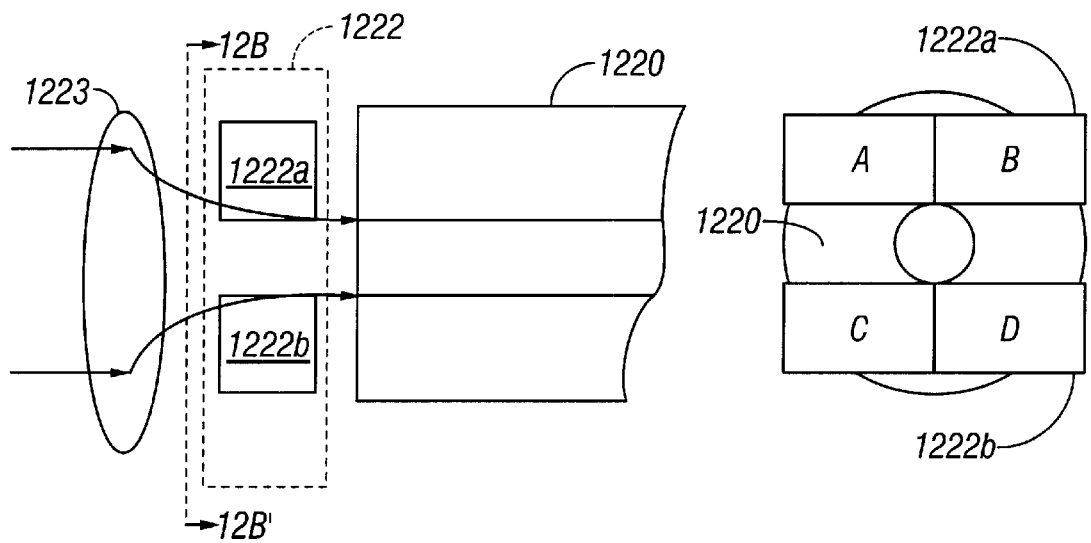
FIG. 12A  FIG. 12B

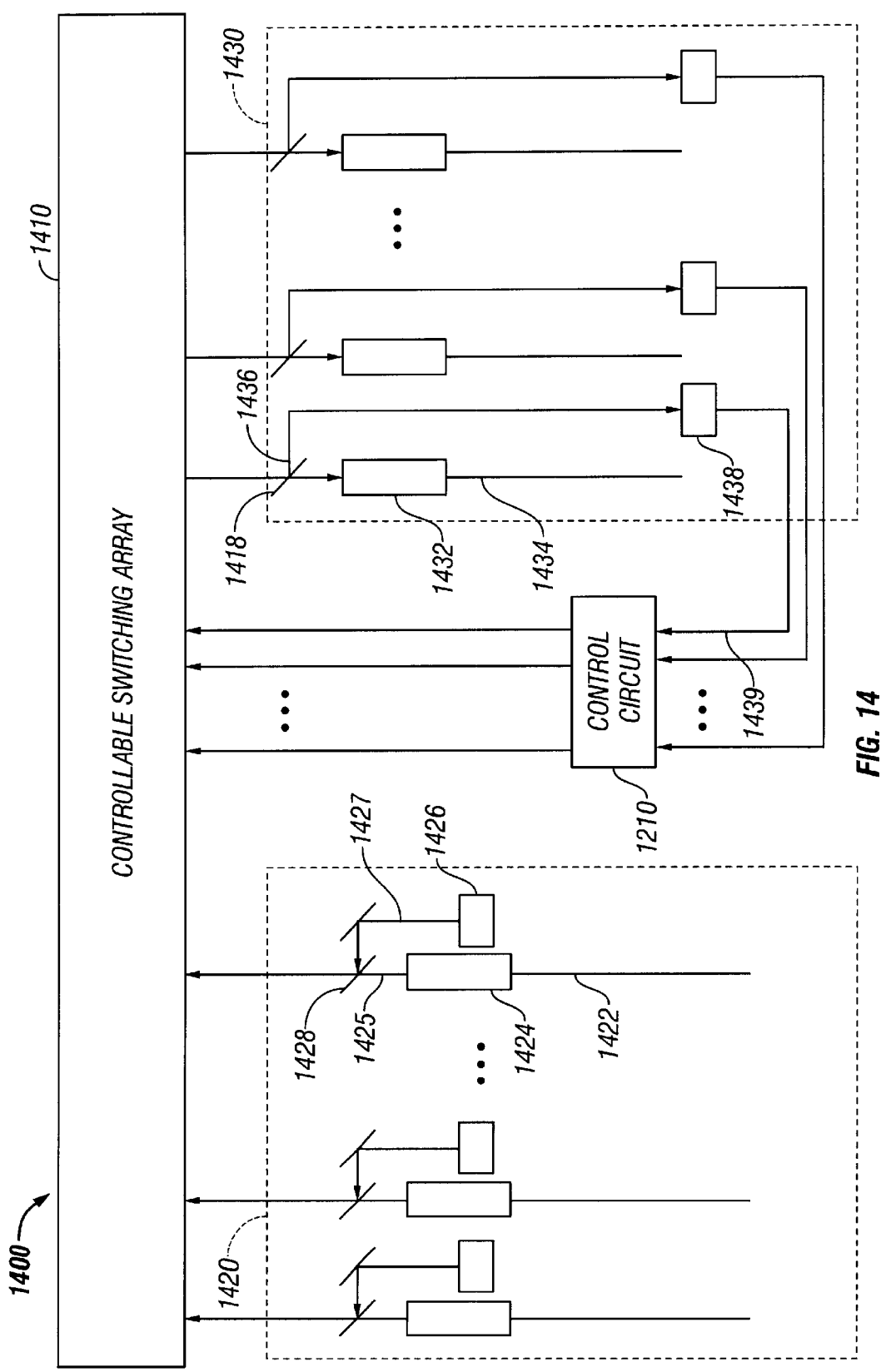

OPTICAL DEVICES ENGAGED TO FIBERS WITH ANGLE-POLISHED FACETS

This application claims the benefits of U.S. Provisional Application No. 60/270,487, entitled SILICON-MOUNTED FIBER COLLIMATOR ASSEMBLY LINKED TO LASER AND COUPLING OPTICS and filed on Feb. 21, 2001, and No. 60/275,254, entitled OPTICAL DEVICES ENGAGED TO FIBERS WITH ANGLE-POLISHED FACETS filed on Mar. 12, 2001.

BACKGROUND

This application relates to optical fibers and fiber devices, and more specifically, to devices coupled to fibers with angle-polished facets.

Optical fibers are widely used in transmission and delivery of optical signals from one location to another in a variety of optical devices and systems. A typical fiber includes a high-index fiber core and a low-index cladding layer surrounding the fiber core to form an optical waveguide and to guide the optical energy along the fiber core. Such a fiber may be used to carry an optical signal at a single wavelength or multiple optical signals at different wavelengths.

The end facet of a fiber may be fabricated in two different configurations. In one configuration, the end facet is substantially perpendicular to the fiber core. An optical signal propagating along the fiber core, when exiting such an end facet, usually does not significantly deviates from the longitudinal direction of the fiber core. However, the end facet can cause optical reflection which may adversely interfere with the optical signals or affect a device that receives such reflection. To mitigate this problem, the end facet may be polished to form an acute angle with respect to the longitudinal direction of the fiber core. This angle-polished facet still reflects light but at a direction different from the optical signals along the fiber core. Hence, the reflected light generally does not interfere with a signal along the fiber core.

SUMMARY

The devices of the present disclosure are designed in part to couple with one or more fibers that are angle-polished to reduce the adverse effects of optical reflection. Each fiber is mounted so that the longitudinal direction of the fiber core forms an angle with respect to an optical axis of a device along which an optical beam is coupled to or from the angle-polished end facet of the fiber.

BRIEF DESCRIPTION OF THE DRAWINGS

FIGS. 12, 12A, 12B, 13, 14, 14A, 14B, and 15 show exemplary switching systems that use designated global optical servo beams to implement the global optical position sensing.

DETAILED DESCRIPTION

Light guided in a fiber propagates along the fiber axis in the longitudinal direction of the fiber. When an end facet is cut perpendicular to the fiber axis, the guided light exits the facet essentially along the fiber axis. When the end facet is cut at an angle with respect to the direction perpendicular to the fiber axis, the optical refraction effect at the end facet changes the direction of light when it exits the end facet so that the output light propagates in a direction that is at an angle with respect to the fiber axis. For typical commercial silica fibers, if the end facet is polished with an angle $\theta$ at about 8 degrees with respect to the direction perpendicular to the fiber axis, the direction of the output light at 1555 nm is about $\delta=3.4$ degrees with respect to the fiber axis. This angled output direction of light may be undesirable or present certain technical difficulties in certain fiber devices. For example, on a substrate where an angle-polished fiber is engaged with its fiber axis parallel to the substrate surface, it may be difficult to position an optical collimator lens on the substrate to receive light from the fiber and to produce a collimated beam along the optic axis of the lens that is also parallel to the substrate surface.

One way to mitigate this problem is to mount the angle-polished fiber at a selected angle with respect to the substrate surface to offset the angular deviation of the output light from the fiber axis so that the output light from the fiber is parallel to the substrate surface. Hence, other optical elements mounted on the substrate surface may be oriented to have their optical axes parallel to the substrate surface to couple light to or from the angle-polished fiber.

Figure 1:
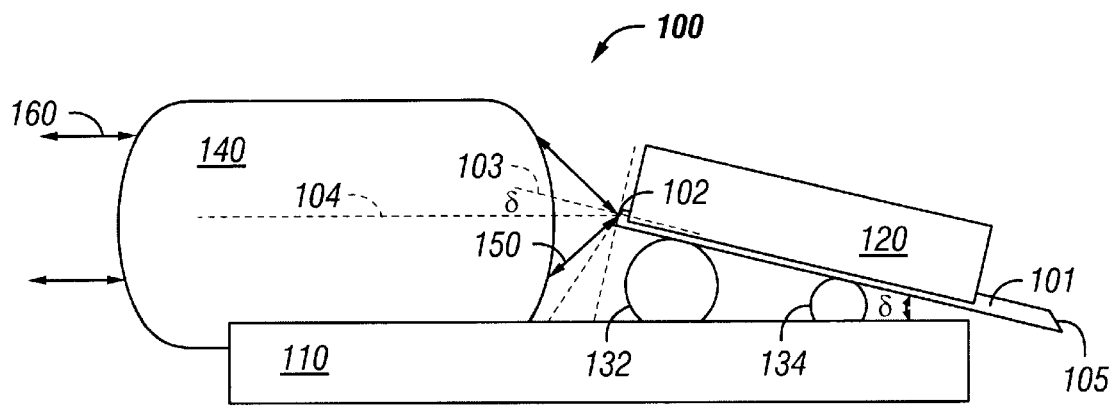
FIGS. 1 and 2 show two exemplary fiber collimator assemblies.

FIG. 1 shows one embodiment of an optical fiber collimator assembly 100 that integrates an angle-polished fiber 101 and a collimator lens 140 to a common substrate 110. The substrate 110 may be formed of a semiconductor material or other suitable solid-state materials such as glasses, ceramics, or metals. A straight groove may be formed on one substrate surface to place the collimator lens 140 so that the optic axis of the lens 140 is substantially parallel to the substrate 110. The collimator lens 140 may be in a number of lens configurations. For example, a ball lens, formed of a sphere or a truncated sphere as illustrated, may be directly mounted to the groove in the substrate 110. A GRIN lens may also be used. The fiber 101 has an angle-polished end facet 102 with a facet angle θ with respect to the direction perpendicular to the fiber axis 103 along the longitudinal direction of the fiber 101.

Instead of mounting the fiber 101 directly to the substrate 101, the fiber 101 is engaged to another substrate 120 with its fiber axis 103 parallel to the substrate 120. The substrate 120 is then mounted and engaged to the substrate 110 at an angle δ with respect to the substrate 110 which is substantially equal to the angular deviation of the output direction 104 of the output light 150 from the fiber axis 103. This angle δ depends on the refractive index of the fiber core and the angle θ of the end facet 102. The output light 150 generally forms a cone around the output direction 104.

The fiber 101 may be mounted on the substrate 120 so that the end facet 102 is tilted towards the substrate 120. When the fiber 101 and the substrate 120 are mounted onto the substrate 110, the end facet 102 faces away from the substrate 110. In this configuration, the output direction 104 of the output beam 150 is substantially parallel to the substrate 110. When the heights of the center of the collimator lens 140 and the end facet 102 are approximately the same and the end facet 102 is at the focal plane of the lens 140, the output beam 150 is collimated by the lens 140 to become a collimated beam 160 at the other end of the lens 140 that is parallel to the substrate 110. Conversely, a collimated beam 160 received by the lens 140 can be focused to the end facet 102 as a beam 150 and hence coupled into the fiber 101.

The substrate 120 may be processed to have a groove in which the fiber 101 is placed and bonded. Two balls 132 and 134 of different diameters may be used as the engaging elements to engage the substrates 110 and 120 to each other and to tilt the substrate 120 relative to substrate 110 at the desired offset angle δ. The ball bearings 132 and 134 may be bonded to the substrates 110 and 120. The diameters of the balls 132 and 134 and their spacing on the substrate 110 are selected so that the end facet 102 is about the same height of the center of the lens 140 and the tilted angle of the substrate 120 is substantially equal to δ. To facilitate the alignment of the fiber 101 with respect to the lens 140, the balls 132 and 134 may be placed in the groove for holding the lens 140. Two pairs of balls 132 and 134 may be used.

Figure 2:
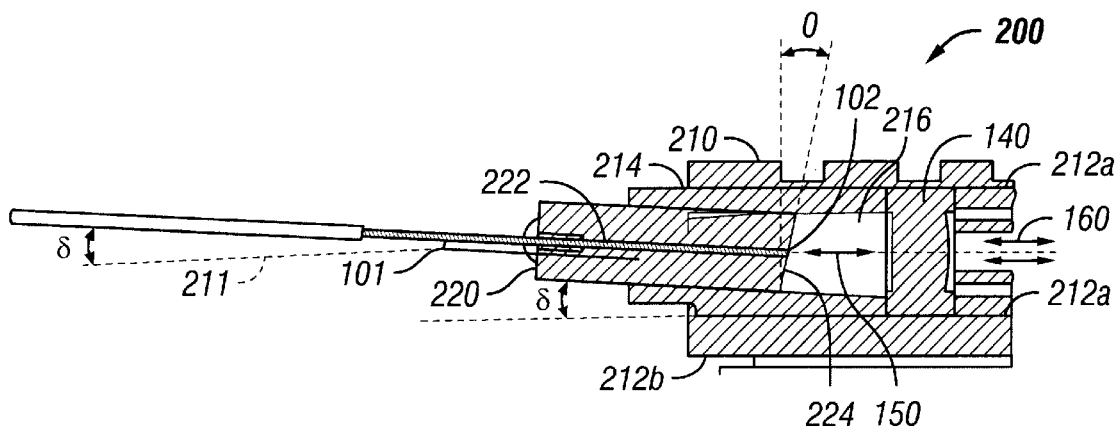

FIG. 2 shows another embodiment of an optical fiber collimator 200 that integrates an angle-polished fiber 101 and a collimator lens 140 to an optics mount 210 which is configured to have a through hole along a symmetry axis 211 with an inner surface 212A and an outer surface 212B. A sleeve 214 is designed to have an exterior that fits into the through hole of the optics mount 210 and an angled bore 216 which forms the desired offset angle δ with respect to the axis 211 of the optic mount 210. A fiber holder 220 is designed to have a fiber-holding channel 222 to engage and hold the fiber 101. The angled facet 102 is exposed at an end surface 224 of the fiber holder 220. The exterior of the fiber holder 220 is shaped to fit the interior of the sleeve 214, i.e., the angled bore 216, so that the fiber 101 is tilted at the desired offset angle δ so that output beam 150 is substantially parallel to axis 211 of the optics mount 210. The collimator lens 140 is mounted to the optics mount 210 with its optical axis parallel to the axis 211 of the optics mount 210.

In operation, the fiber collimator assembly 100 or 200 may be coupled to a fiber device or system by contacting the base surface 212 to a support surface on which other optical elements are mounted. The following sections describe various fiber devices and systems that use the fiber collimator assembly 100 or 200.

Fiber-Laser Modules

Figure 3:
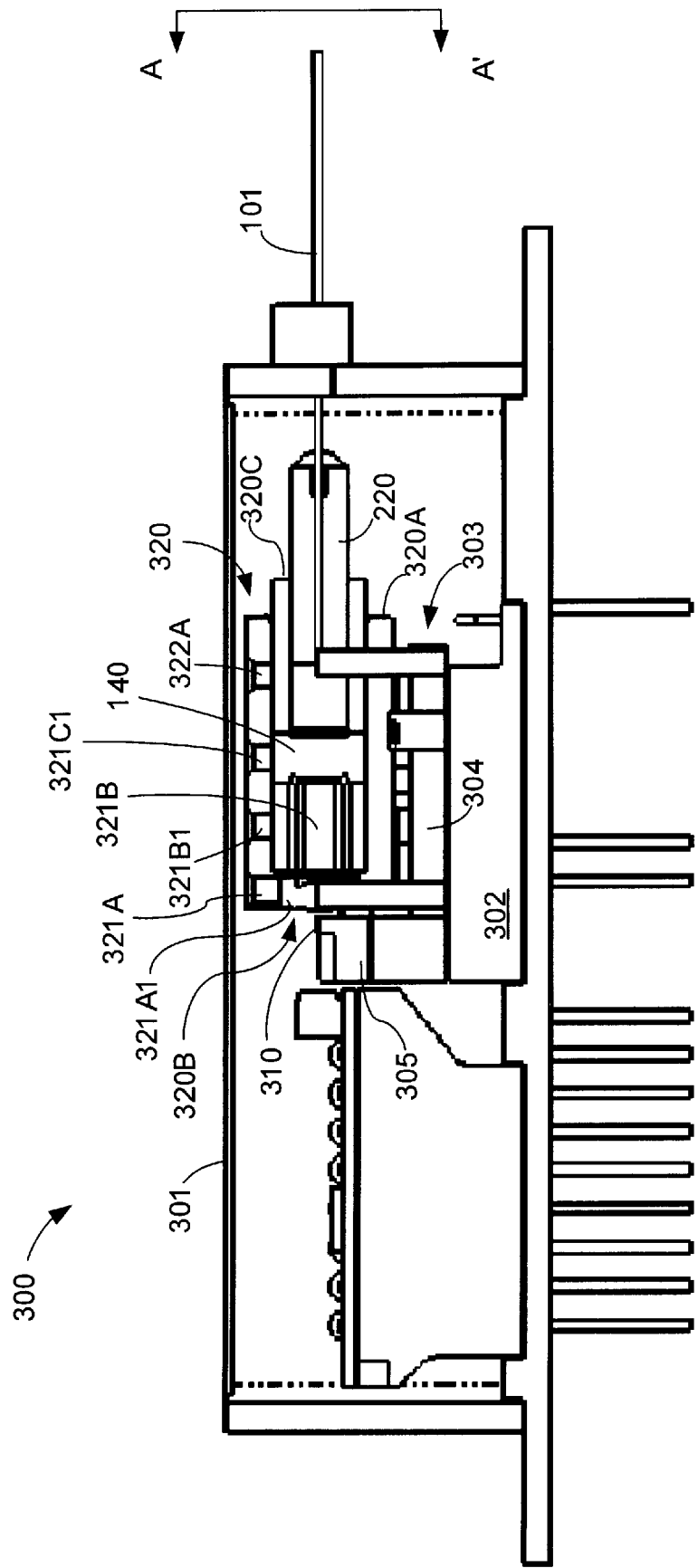
FIG. 3 shows one embodiment of a fiber-laser module which includes a support platform, a compact laser, and a fiber collimator assembly shown in FIGS. 1 and 2.

FIG. 3 shows an exemplary optical fiber-laser module 300 according to one embodiment. The entire assembly is built on a base 302 and is enclosed in a housing 301. A support module 303 is formed over the base 302 and may be a single piece formed of a rigid material or two separated pieces that are fixed to the base 302. The support module 303 may include a first part 305 to mount a light source 310 (e.g., a diode laser or LED), and a second part which includes a support platform 304 to mount a fiber coupler module 320 so that the light source 310 and the fiber coupler module 320 are optically aligned with each other to couple the light from the laser 310 into the fiber coupler module 320. A fiber 101 is coupled to the fiber coupler module 320 to receive and transport the light from the laser 310 to a destination outside the assembly 300.

The fiber coupler module 320 may include a coupler housing 320A which has two openings 320B and 320C at opposite ends along the optical path of the assembly 300. The exterior of the coupler housing 320A may be cylindrical with some portion flattened for engaging to other components. The opening 320B is used to receive light from the laser 310 and the opening 320C is used to receive the fiber 101 into which the received light from the laser 310 is coupled. The coupler housing 320A may be designed to incorporate the fiber collimator assembly 200 in FIG. 2 for holding the fiber 101 so that the fiber 101 is tilted with respect to the optical path of the light from the laser 310 for proper optical coupling between the laser 310 and the fiber 101. The coupling optics may include, for example, a laser collimating lens 321A that modifies the divergent beam from the laser 310 to be collimated and a fiber collimator lens 140 that focuses the collimated beam into the receiving terminal of the fiber 101. An optical isolator 321B may also be included to reduce adverse optical feedback to the laser 310 due to optical reflections at various surfaces in the optical path.

In one implementation, the coupler housing 320A may be designed to engage to the coupling optics 321 and the fiber fitting unit 220 without separate mounting devices. For example, a cylindrical through channel may be formed to connect the openings 320B and 320C. The coupling optics and the fiber fitting unit 220, when properly shaped, can be inserted into the cylindrical through channel and fixed at their proper positions relative to each other according to the optical parameters of the coupling optics so that the light from the laser 310 can be coupled into the fiber 101. One way for fixing the optical elements in the optics 321 and the fiber fitting unit 220 uses one or more set screws on the through holes 321A1, 321B1, 321C1, and 322A formed on the side wall of the coupler housing 320A. Alternatively, the optical elements 321A, 321B, 140, and the fiber fitting unit 220 may be affixed at their respective positions by adhering them to the inner wall of the cylindrical through channel with a proper epoxy.

A special engagement mechanism may be implemented in the assembly 300 for mounting the fiber coupler module 320 onto the platform 304. This mechanism includes parts on both the fiber coupler module 320 and the platform 304 to fix the position and orientation of the fiber coupler module 320 on the platform 304 with respect to the laser 310.

Figure 4:
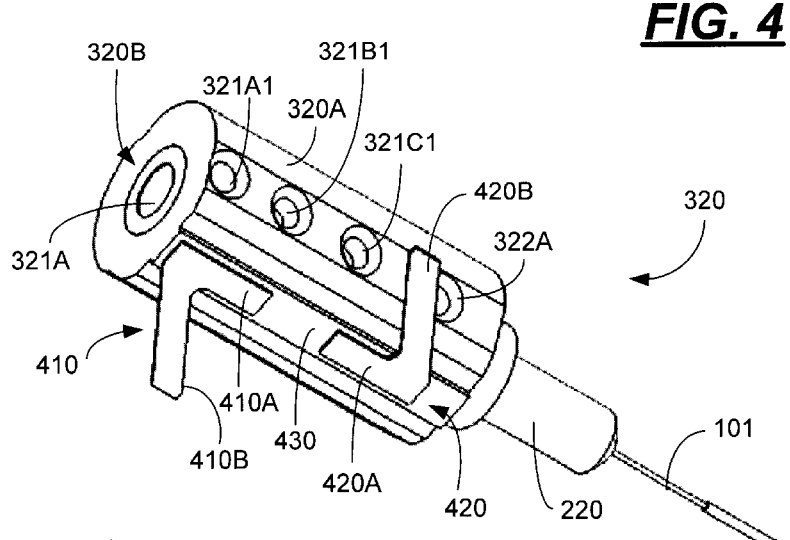
FIG. 4 shows a three-dimensional view of the fiber-laser module and its respective engagement mechanism for engaging to the support platform shown in FIG. 3.

FIG. 4 shows two horizontal engaging bands 410 and 420 formed on the cylindrical exterior of the fiber coupler module 320 as one part of the engagement mechanism. The bands 410 and 420 may be formed of a metal, an alloy, or other suitable materials so that the bands 410 and 420 are substantially rigid but can be slightly deformed to produce a resilient force. Each horizontal band 410 or 420 includes a first elongated part, 410A or 420A, for engaging the band onto the fiber coupler module 320 and a second elongated part, 410B or 420B, for engaging the fiber coupler module 320 to the platform 304. The first and second parts, 410A and 419B, or 420A and 420B, in general form an angle with respect to each other. This angle may be 90 degrees or an acute angle. A portion 430 of the cylindrical exterior of the fiber coupler module 320 may be flat for attaching the first parts 410A and 420A of the horizontal bands 410 and 420. The first parts of the two bands 410 and 420 may be fixed to the flat portion 430 of the fiber coupler module 320 at two different locations that are substantially along the cylindrical axis of the fiber coupler module 320. One way to attach the first parts 410A and 420A to the fiber coupler module 320 is laser welding.

Figure 5:
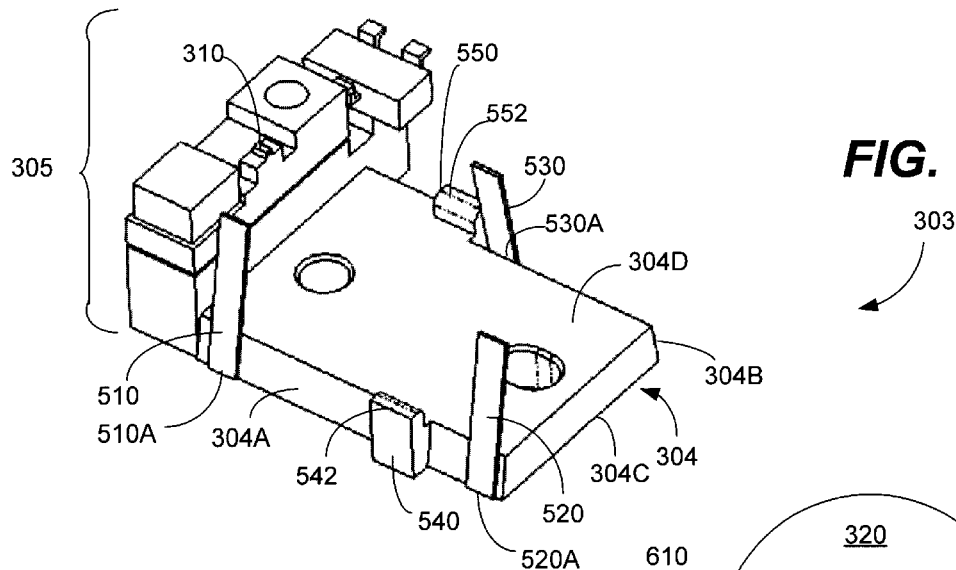
FIG. 5 shows a three-dimensional view of the support platform an its respective engagement mechanism for engaging to the fiber-laser module shown in FIG. 3.

FIG. 5 shows another part of the engagement mechanism implemented on the platform 304. The platform 304 includes a top flat surface 304D to interface with flat portion 430 with the horizontal bands 410 and 420 of the fiber coupler module 320 and a bottom opposing surface 304C to be placed on the base 302. Three vertical bands 510, 520, and 530 are formed on two opposite side surfaces 304A and 304B of the platform 304. The opposite side surfaces 304A and 304B are substantially along the optic axis of the fiber coupler module 320 when the fiber coupler module 320 is set to a proper position relative to the platform 304. Two vertical bands 510 and 520 are engaged to two different locations 510A and 520A on the side surface 304A and the vertical band 530 is engaged to the opposite side surface 304B at a location 101A between 510A and 520A.

The opposite side surfaces 304A and 304B on the platform 304 may be parallel to each other or form a small acute angle towards each other so that the planes defined by the side surfaces 304A and 304B intercept each other on the side of the top supporting surface 304D. However configured, prior to engaging the vertical bands 510, 520, and 530 to the exterior of the fiber coupler module 320, the fiber coupler module 320 should be in contact with the vertical bands 510, 520, and 530 without causing substantial deformation so that the pressure at each contact area is small.

Figure 6:
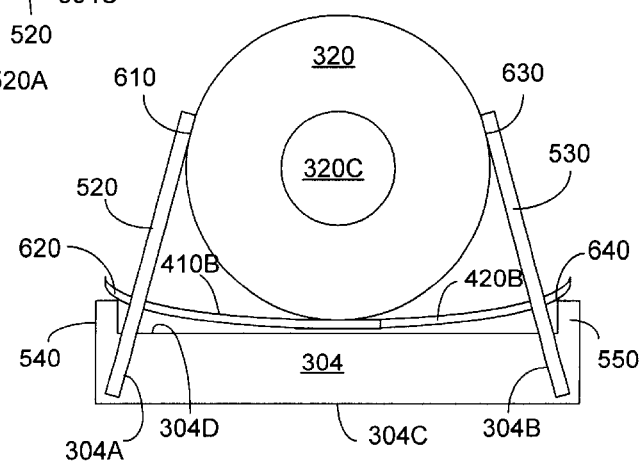
FIG. 6 shows a cross sectional view of the fiber-laser module in FIG. 3.

FIGS. 5 and 6 illustrate the configuration where the vertical bands 510, 520, and 530 are slightly slanted with respect to the vertical direction at essentially the same angle as that between the side surfaces 304A and 304B. This angle is designed so that, when the fiber coupler module 320 is placed above the top supporting surface 304D between the vertical bands 510, 520 and the vertical band 530, each of the vertical bands 510, 520, and 530 is slightly deflected to touch the exterior surface of the fiber coupler module 320 and is slightly bent to apply a pressure on the fiber coupler module 320. This three-point contact configuration can secure a proper initial position of the fiber coupler module 320 to couple the light from the laser 310 into the fiber 101.

Two additional support structures 540 and 550 may also be respectively formed on the side surfaces 304A and 304B of the platform 304. Each support structure has a standoff portion, 542 or 552, above the top flat surface 304D of the platform 304 to contact and support a horizontal band, 420 or 410, respectively, when the fiber coupler module 320 is placed in a nominally aligned position over the platform 304. The support structures 540 and 550 are displaced from each other respectively along the side surfaces 304A and 304B by about the same spacing between the horizontal bands 410 and 420 on the fiber coupler module 320.

In assembly, the fiber coupler module 320 is first placed between the vertical bands 530, and 510, 520 so that the fiber coupler module 320 is suspended over the top supporting surface 304D by the two horizontal bands 410 and 420 that are respectively rest on the standoff portions 552 and 542 of the support structures 540 and 550. The upper portions of the vertical bands 510, 520, and 530 are slightly deflected to touch the exterior surface of the fiber coupler module 320. Similarly, the parts 410B and 420B of the horizontal bands 410 and 420 are also slightly deflected to exert a force against the fiber coupler module 320 so that the parts 410A and 420A on the flat portion 420 of the exterior of the module 320 are suspended above the top surface 304D with a small gap. Next, the position and orientation of the fiber coupler module 320 are adjusted to maximize the output from the fiber 101. Finally, the contacts of the vertical bands 510, 520, and 530 with the exterior of the fiber coupler module 320, and the contacts of the horizontal bands 410 and 420 with the platform 304 are fixed by, e.g., laser welding or epoxy, at the position where the optical coupling is at or near the maximum. All six degrees of freedom of the fiber coupler module 320 are now fixed with respect to the platform 304.

FIG. 6 illustrates a view along the lines AA' in FIG. 3 after the fiber coupler module 320 is placed above the platform 304. The vertical band 520 is shown to touch one side of the module 320 at a location 610. The vertical band 530 is shown to touch on the other side of the module 320 at another location 610. These locations 610 and 620 are fixed by welding or applying epoxy. Locations 620 and 640 are also fixed so horizontal bands 410 and 420 are fixed to the platform 304 without contacting the top surface 304D.

Figure 7A:
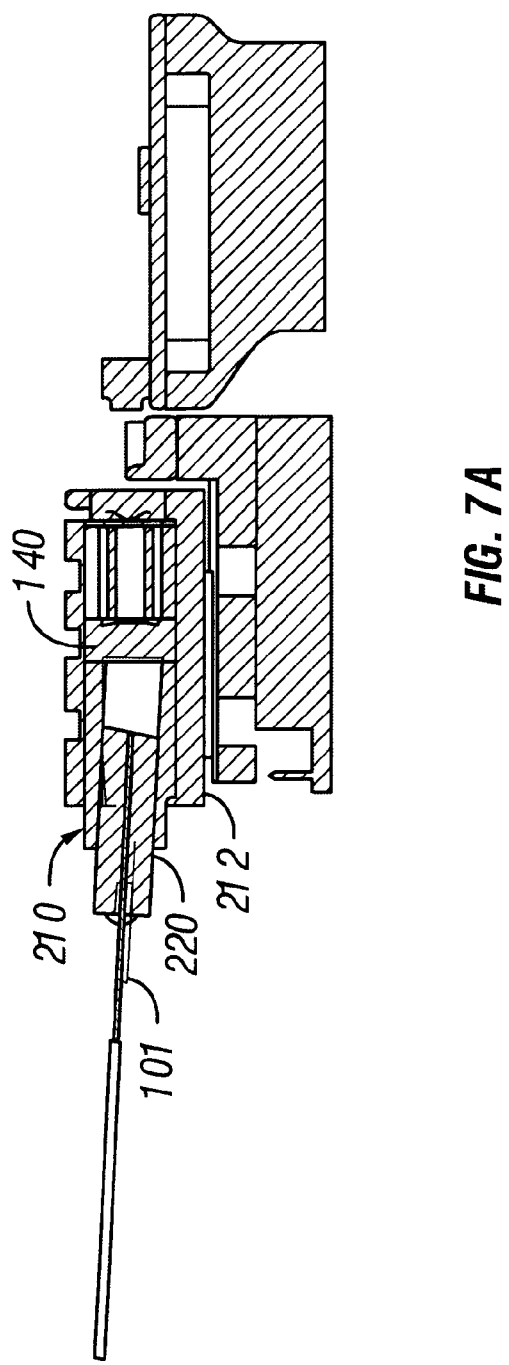
FIG. 7A further shows a fiber-laser module using a fiber collimator shown in FIG. 2.

FIGS. 7A shows another implementation of the fiber-laser module using the fiber collimator assembly 200 in FIG. 2.

Figure 7B:
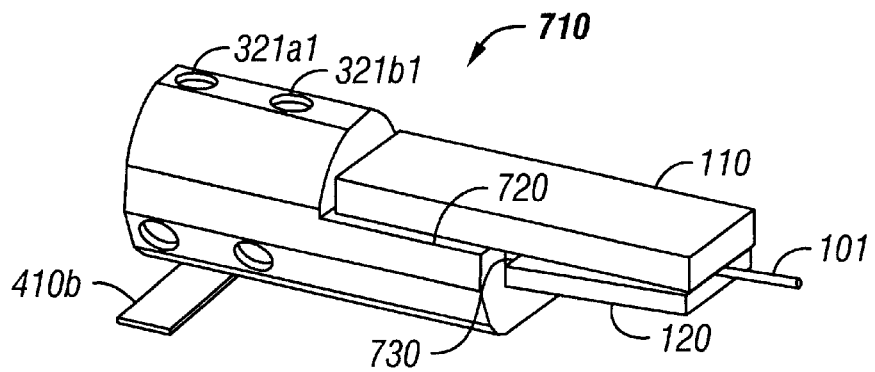
FIGS. 7B and 7C show a fiber-laser module using a fiber collimator shown in FIG. 1.
Figure 7C:
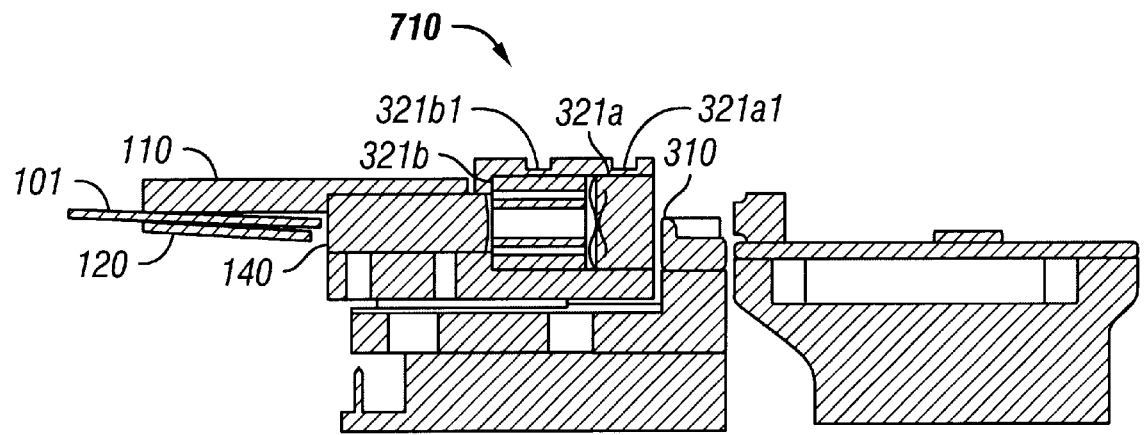

FIGS. 7B and 7C show yet another implementation of the fiber-laser module using the fiber collimator assembly 100 in FIG. 1. The module 320 in FIGS. 3 through 6 is modified as a module 710 where the sleeve portion 214 is substituted by a support port 720 where a groove 730 is formed to receive the collimator lens 140 of the assembly 100. FIG. 7C shows a side view of this fiber-laser module.

Optical Switches

An optical switch may include a device to direct at least one optical beam from one direction of propagation to another direction of propagation. Multiple optical switches may be used to form a switching array to switch and direct an array of input optical beams to their respective outputs. Such an optical switching array may be designed to perform blocking switching and non-blocking switching. In a blocking switching array, when a first beam is directed to a selected output, another beam can be switched to only certain outputs and are blocked from reaching other outputs. In a non-blocking switching array, any input beam can be switched to reach any output. It is desirable to use non-blocking switching arrays to provide flexibility and versatility in directing optical beams in optical WDM communication systems and other optical systems that implement optical switching from multiple inputs to multiple outputs.

Optical switch designs and switching techniques of the present disclosure include optical switching arrays having adjustable reflectors that are coupled to their respective positioning actuators and are actively controllable to direct optical beams in free space. For example, multiple optical beams from one set input terminals such as input fibers may be directed to a set of receiving terminals such as output fibers through one or more optical switching arrays. A local optical position sensing mechanism can be implemented to monitor any deviation in the orientation of each individual reflector from a desired orientation at which an optical beam directed by that reflector is properly aligned. A servo optical beam may be used to monitor and measure the orientation of each reflector. This servo optical beam may be a separate beam that does not carry communication data and is independent of the signal beam to be switched.

Hence, a local servo control mechanism can be formed in each reflector to control the actuator for each reflector, in response to a corresponding deviation indicator signal from the local optical sensor, to compensate for positioning errors in each reflector. In addition, a global optical sensing mechanism may be used to monitor and measure the overall alignment of a signal beam from a switching array to provide a fine positioning information for the switching elements involved in directing that signal beam so that one or more of those switching elements may be adjusted to finely align the signal beam.

Each switching array may be designed to use at least two different switching elements to direct any optical beam received from an input terminal, e.g., an input fiber port, to reach a desired output terminal. This arrangement, in combination of the local servo, the global servo, or both, can be used to achieve reliable and accurate optical alignment in each switching operation.

Each switching array generally includes multiple switching elements, each of which may include an adjustable reflector for re-directing an optical beam. A positioning actuator may be coupled to the reflector to control the orientation of the reflector in at least two ways. First, the actuator can set the reflector at two or more predetermined orientations for switching operations. Secondly, the actuator is operable to adjust the reflector around each predetermined orientation to optimize the alignment of the optical beam directed thereby.

Actuators for the reflectors may be one-dimensional (1D) actuators that are operable to rotate their respective reflectors around a single rotation axis, or two-dimensional (2D) actuators that are operable to rotate their respective reflectors with respect to two different rotation axes (e.g., two orthogonal axes). Such 1D or 2D actuators may be implemented in a variety of configurations, including galvanometer actuators and micro-electro-mechanical systems (MEMS) fabricated on semiconductor wafers.

A switching array may be designed to provide two or more switching elements in each optical path within the switching array to allow for a sufficient number of degrees of freedom in adjusting the direction of each signal beam. For example, the direction of a signal beam directed to a receiving optical terminal in a switching array may be adjusted in at least four different degrees of freedom at the receiving optical aperture of the terminal, such as the input fiber facet of a receiving fiber or photodetector.

Figure 8:
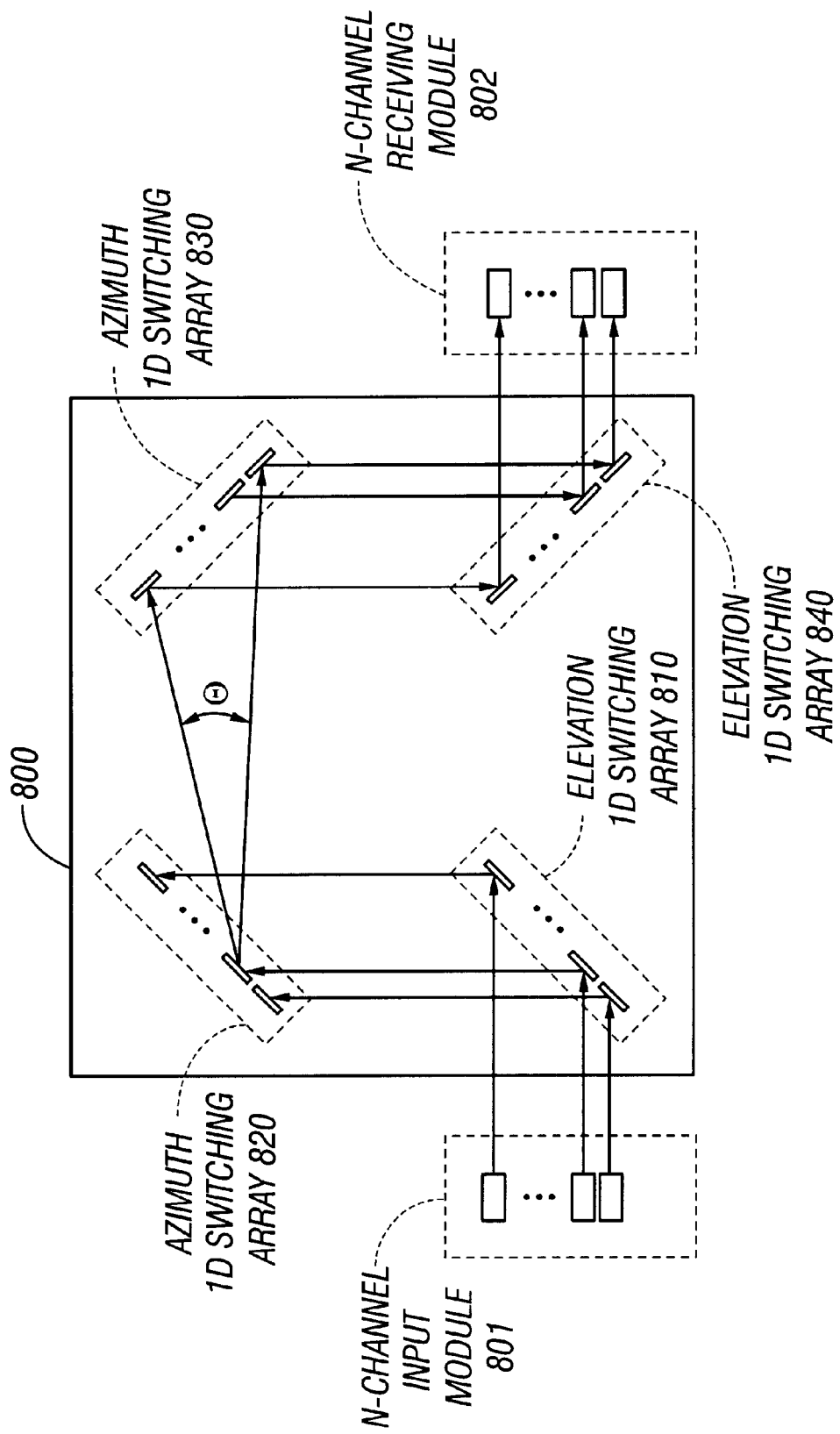
FIGS. 8, 9, and 10A show three examples of non-blocking switching arrays.

FIG. 8 illustrates an exemplary switching array 800 based on 1D actuators in all reflectors in a non-blocking configuration. An input module 801 and a receiving module 402 with the same number (N) of terminals are coupled to the switching array 800. The switching array 800 includes 4N switching elements with 1D actuators that are arranged in 4 linear switching arrays 810, 820, 830, and 840 each with N switching elements. Two reflectors within the same linear switching array do not receive a signal beam from or send a signal beam to each other. Each signal beam is reflected four times by four different reflectors respectively in the four linear switching arrays 810 through 840 to provide the four degrees of freedom in alignment.

Two linear switching arrays, 810 and 830, are positioned to respectively receive input signals from the input module 801 and to send the switched signals to the receiving module 802. One switching element in each of the arrays 810 or 840 only receives a signal beam from or sends a signal beam to a designated terminal in the input module 801 or the receiving module 802 as illustrated. In addition, each switching element in the array 810 only receives a signal beam from or sends a signal beam to a designated switching element in the array 820. Similarly, each switching element in the array 840 only receives a signal beam from or sends a signal beam to a designated switching element in the array 830. Furthermore, each 1D switching in the arrays 810 and 840 can change the direction of a signal beam in the elevation direction.

The linear switching arrays 820 and 830 are formed of 1D switching elements that change the directions of their respective signals beams in the azimuth direction. In particular, the arrays 820 and 830 are positioned relative to each other to allow any reflector in one of the arrays 820 and 830 to receive a signal beam from or send a beam from to any one of N switching elements in the other array. Hence, for a given angular scanning range $\Theta$ for each reflector, the linear switching arrays 820 and 830 should be spaced and positioned so that each linear switching array is within the field of view of each switching element of another linear switching array, such as between arrays 810 and 820, and between arrays 820 and 830. Therefore, the linear switching arrays 820 and 830 are used to perform the actual switching operations in the system 800. All four 1D arrays 810 through 840, however, are used to align the signal beams.

Figure 9:
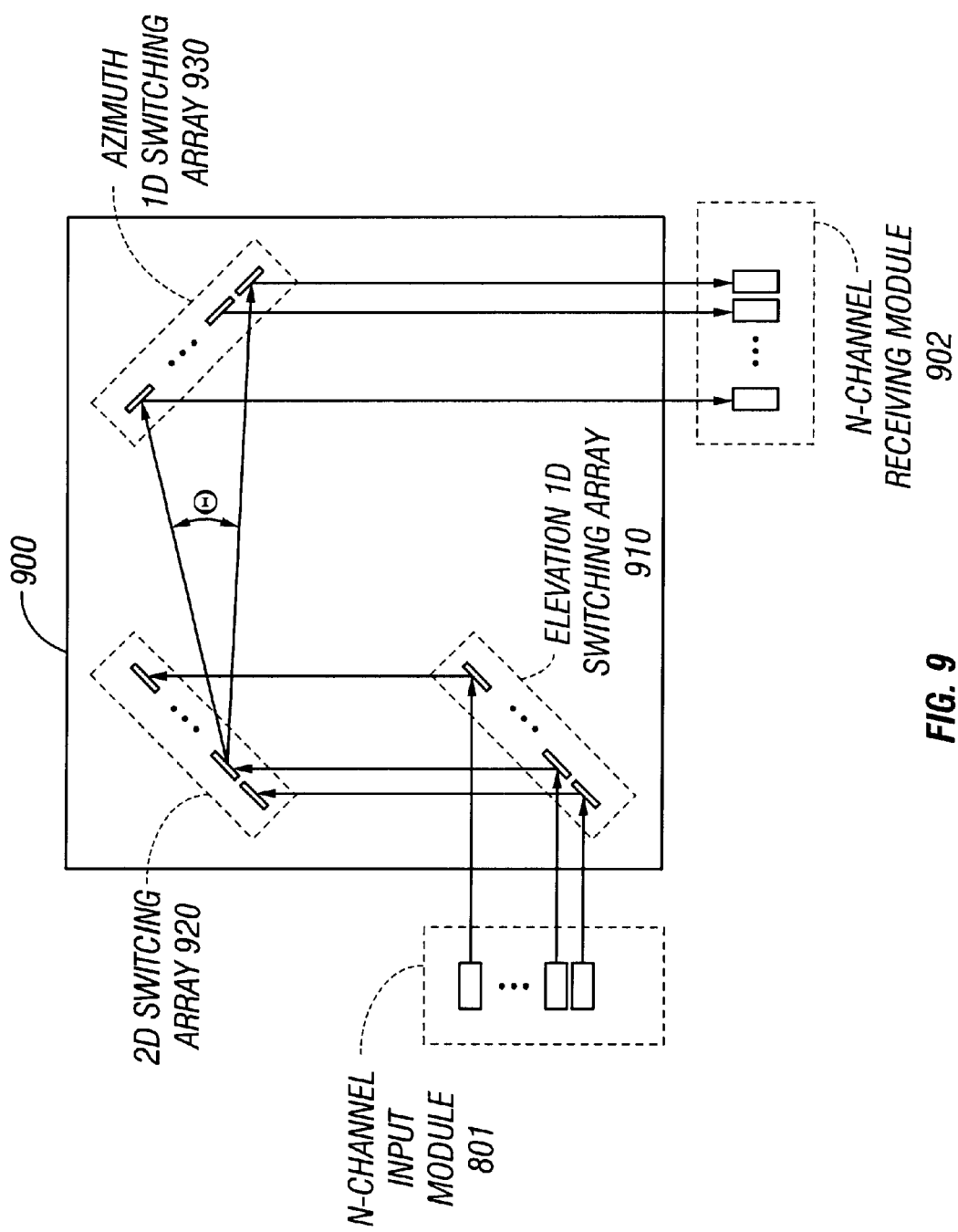

FIG. 9 shows another non-blocking switching array 900 with three linear switching arrays 910, 920, and 930, two of which, e.g., 910 and 930, have 1D reflectors in two orthogonal directions, and one of which, e.g., 920 has 2D reflectors.

Figure 10A:
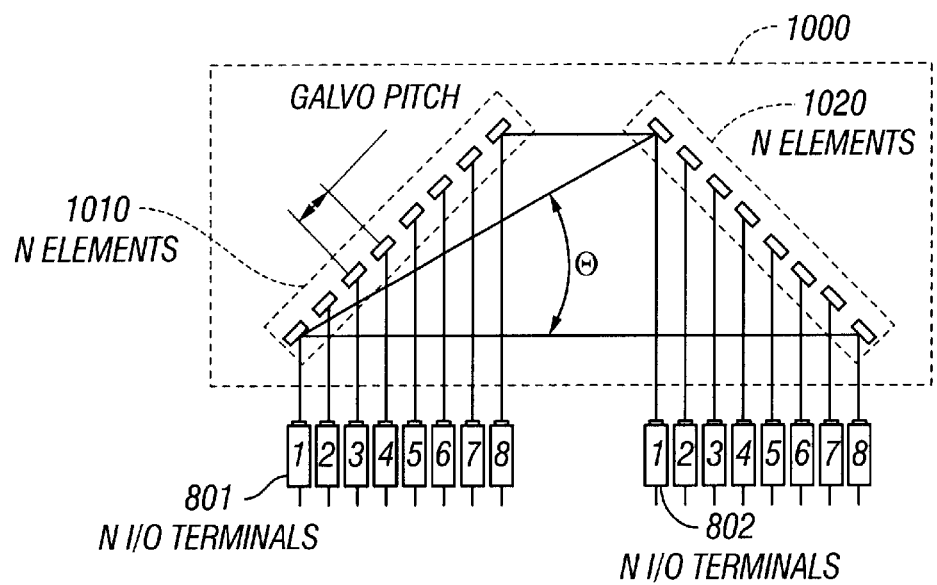

FIG. 10A shows yet a third example of a non-blocking switching array 1000 having two 2D N-element linear switching arrays 1010 and 1020 so that each beam is reflected only twice by two different switching elements. Hence, using 2D reflectors can reduce the number of switching elements needed In addition, using 2D reflectors can improve the alignment tolerance for a given size of the receiving optical aperture in each switching element. For example, any alignment error caused by a small angular error may be amplified in displacement by the total traveling distance of each beam for using 1D linear switching arrays.

The switching array 800, 900, and 1000 may operate bi-directionally to switch channels from the I/O module 801 to the I/O module 802 or vice versa.

Figure 10B:
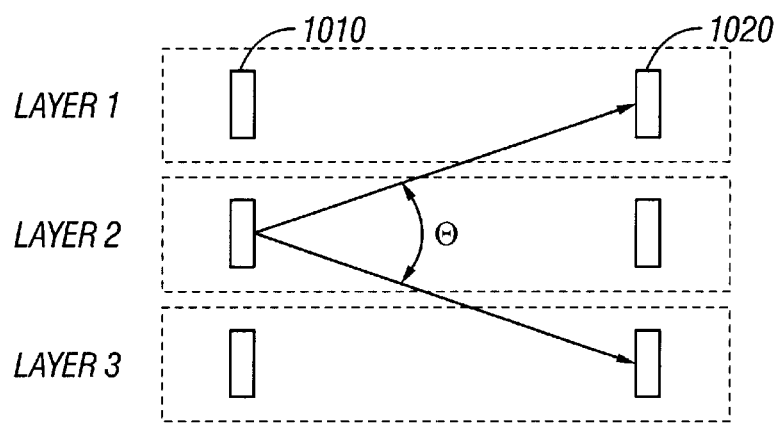
FIGS. 10B and 10C show examples of switching arrays with two or more layers of input and output fiber modules.

In the switching array 1000 in FIG. 10A, the I/O terminals of the I/O modules 801, 802 and the 2D switching elements may be placed substantially in the same plane to form an N×N switch layer. Two or more such layers may be stacked together in parallel to form a (MN)×(MN) switch network where M is the number of stacked layers. Similar to the requirement within each layer, the number of layers, M, is limited to the field of view of each switching element as illustrated in FIG. 10B (M=3) to allow any input from any layer to any output in the same layer or any other layer.

Figure 10C:
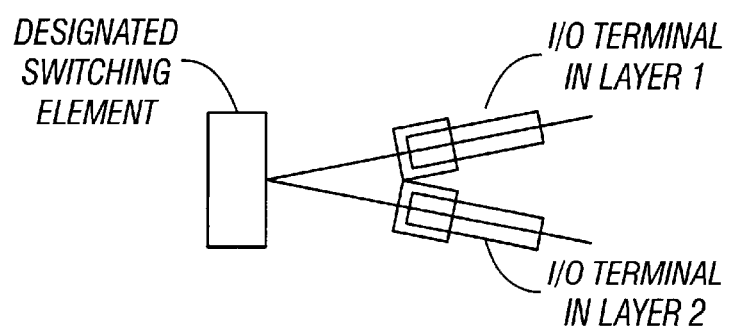

Alternatively, a single switching array 1000 may be used to form an N×(MN) switch network when M layers of I/O modules 801, 802 are stacked in a non-parallel configuration so that fiber terminals at the same position in different layers can optically communicate with a designated switching element in the corresponding designated linear switching array. FIG. 10C illustrates an example of an N×(2N) switching network. The optic axis of the two terminals form an acute angle and intercept at or near the reflector of their designated switching element. When the designated switching element is oriented to direct a beam from one angled terminal to another linear array, the beam from the other angled terminal cannot be directed and hence is blocked. A receiving switching element in the other linear switching array, however, can direct the received beam to any one of the two corresponding angled terminals. Hence, the switching network is either a N-to-MN switch or a MN-to-N switch.

It is recognized that an adjustable reflector may have errors in its orientation. Such position errors may be caused by various factors, including but not limited to a change in the operating environmental parameters (temperature, humidity, vibrations, etc.), the inherent design, or aging of the combination of each reflector and the respective actuator. Hence, it may be desirable to implement a local optical position sensor in each reflector and a control unit to control the actuator to correct the error based on the error measurement obtained from the position sensor.

A local position sensing mechanism for each individual reflector may use a designated optical servo beam to sense the orientation of each reflector. Such a servo optical beam may be independent from a signal beam to be redirected by the reflector and have a completely different optical path from the signal beam. The servo optical beam may have a servo wavelength different from that of the signal beam so that the switching array is a "dual-color" or dichroic optical system.

Figure 11A:
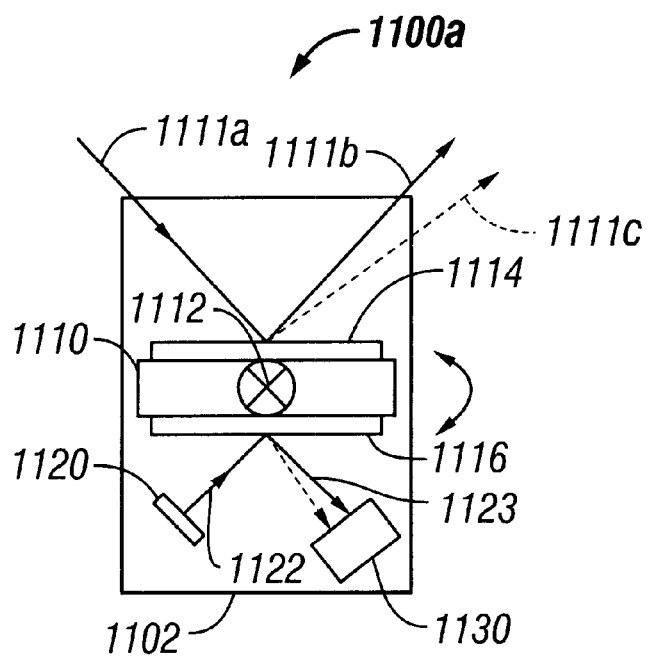
FIGS. 11A and 11B show exemplary local optical position sensing systems that monitor and control individual switching elements at their preset orientations.
Figure 11B:
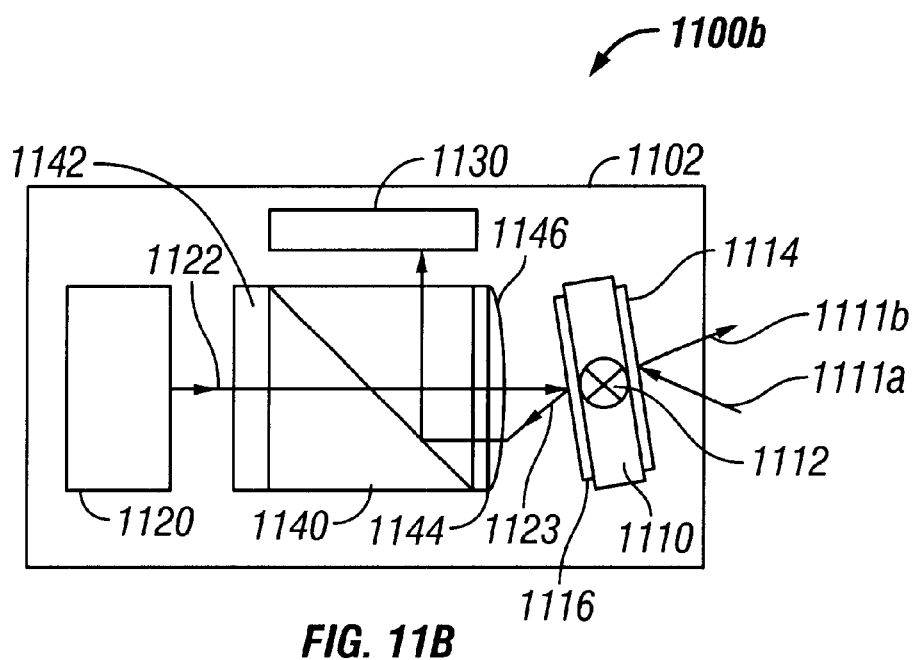

FIGS. 11A and 11B show two different examples of suitable local optical position sensors individual reflectors. FIG. 11A illustrates a switching element 1100a which has a reflector 1110 and an actuator 1112 (e.g., a galvanometer) for controlling the reflector 1110. A base 1102 is used to support both the actuator 1112 and the reflector 1110. The actuator 1112 may be operable to rotate the reflector 1110 with respect to a single rotation axis or two orthogonal rotation axes. The reflector 1110 has a reflective surface 1114 to direct an input signal beam 1111a to another direction along 1111b. In general, the actuator 1112 is operable to set two or more predetermined reflector orientations for switching. When the reflector 1110 directs the input signal beam 1111a to a direction 1111c that deviates from a desired predetermined direction 1111b, the actuator 1112 can be adjusted to correct the deviation and hence to adjust the reflected beam back to the proper direction 1111b. Such operation is possible when the orientation of the reflector 1110 can be monitored by measuring a direction change in a reflection 1123 of an optical servo beam 1122 to detect the deviation.

The reflector 1110 is designed to include a second reflective surface 1116 that may be on the opposite side of the first reflective surface 1114. A light source 1120 and a position-sensing photodetector 1130 are mounted on the base 1102 to generate the servo beam 1122 and to detect a position of the reflected servo beam 1123, respectively. A LED or a diode laser may be used as the light source 1120. The photodetector 1130, which can be used in other embodiments of this disclosure, may include a sensing surface operable to determine a position of the reflected monitor beam 1123. For example, a detector with an array of discrete photosensing areas or pixels such as CCDs or quad detectors may be used. In addition, a semiconductor position sensitive detector with a PIN photodiode may be used. The PIN photodiode may include one or two uniform, resistive surfaces to provide continuous position data of a beam. The relative positions of the reflector 1110, the light source 1120, and the detector 1130 are arranged and calibrated so that the positions of the reflected servo beam 1123 on the detector 1130 can be used to measure the orientations of the reflector 1110. This information is then used to generate a control signal to control the orientation of the actuator 1112 by, e.g., changing the driving current to a respective coil if the actuator 1112 is a galvanometer actuator.

FIG. 11B shows a switch 1100b with an alternative optical sensing mechanism. A polarization beam splitter (PBS) 1140, a quarter wave plate 1144, and a lens 1146 are used to guide the incident polarized servo beam 1122 and the reflected servo beam 1123. The servo beam 1122 is linearly polarized upon entering the PBS 1140 so that it transmits through the PBS 1140. An optical element 1142 may be placed between the light source 1120 and the PBS 1140 to modify the output beam from the light source 1120 so that the beam is linearly polarized along a proper direction and is well collimated. The lens 1146 then images the servo beam 1122 onto the second reflective surface 1116 of the reflector 1110. The reflected servo beam 1123 passes through the lens 1146 and the rotator 1144 for the second time so that its polarization is rotated by 90 degrees with respect to the original polarization. The PBS 1140 then directs the reflected servo beam 1123 to the photodetector 1130 by reflection.

A control circuit may be implemented in the switches in FIGS. 11A and 11B to control the actuator 1112 in response to the position error signal from the position-sensing photodetector 1112. This control circuit may include an optical position sensor such as the examples in FIGS. 11A and 11B to monitor and measure the alignment error in the reflector 1110. The control circuit responds to the position error signal from the optical position sensor to produce a control feedback signal to the respective reflector actuator 1112 (e.g., a galvanometer). The actuator 1112 then adjusts the orientation of its reflector to reduce the error associated with that reflector.

In addition to optical position sensing locally at each reflector, a global optical sensing mechanism may be further implemented to optically monitor and measure the overall alignment of a signal beam that is controlled by two or more reflectors. The local optical sensing may be used to provide a coarse position control and the global optical sensing may be used to provide a fine position control. These two different optical position controlling mechanisms may be combined to enhance the accuracy of the optical alignment in a switching array. The global optical position sensing may be implemented by using a signal beam or a global servo beam independent of the signal beam. Different from the local position sensors in FIGS. 11A and 11B, the global optical sensing does not directly indicate the position errors of individual switching elements in the optical path of a signal beam. Rather, a parameter related to the beam position on the output fiber is measured to indicate the total effect of position errors from two or more switching elements in the path of the signal beam on the final position of the beam on the output fiber.

FIG. 12 shows one embodiment of a global optical position sensing system by measuring positions of the signal beams from the switching array 1210 at the receiving optical apertures of output terminals 1220. A position-sensing photodetector 1222 is placed in front of each receiving optical aperture of an I/O fiber 1220 to measure the position of the received signal beam with respect to the center of the fiber core. A position signal 1224 is generated by each photodetector 1222 to indicate the amount of the position offset at the respective receiving I/O fiber. A global control circuit 1230 responds to each position signal 1224 to generate an alignment control signal 1232 to control at least one of the two or more reflectors in the optical path of the signal beam associated with the position signal 1224 to reduce the alignment error at the respective I/O fiber 1220.

FIG. 12A is a side view along the line A–A' of the detector 1222 and the receiving I/O fiber 1220. FIG. 12B is a view along the line B–B' in the optic axis of the fiber 1220. In front of the optical receiving aperture of each I/O fiber 1220, a coupling lens 1223 is used to couple a beam into or out of the fiber core. The position sensing photodetector 1222 may include two bi-cell detectors 1222a and 1222b each with two sensing cells. The detectors 1222a and 1222b may be placed between the fiber aperture of the fiber 1220 and the lens 1223 in the opposing sides of the fiber core. Hence, the signal differences of (A–B) and (C–D) indicate the alignment error along one direction and the signal difference (A+B)–(C+D) indicates the alignment error along the orthogonal direction. This positioning signal 1224 includes information on these signal differences and is fed to the global control circuit 1230 to control the relevant reflectors in the switching array 1210.

Figure 13:
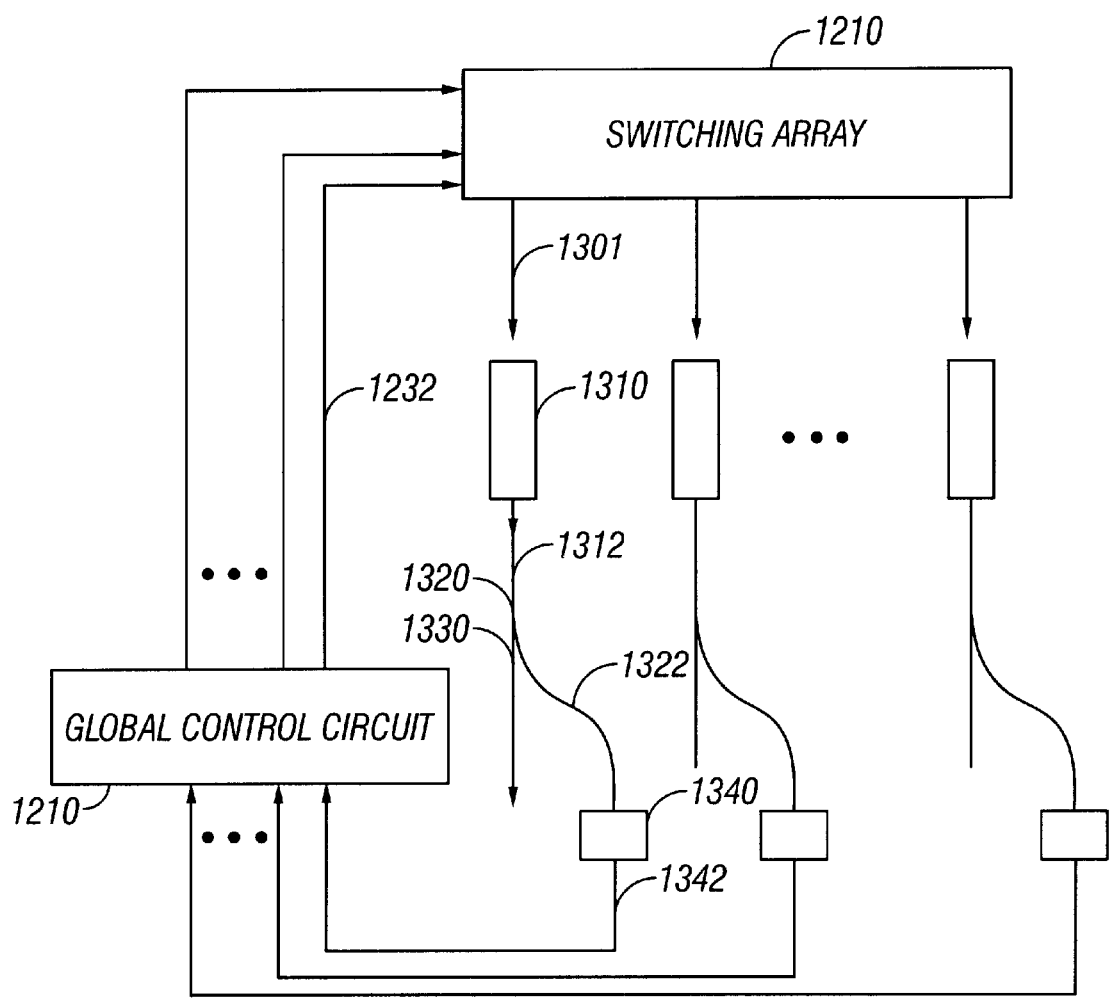

FIG. 13 shows another embodiment of a global optical position sensing system that measures signal beams at the receiving optical apertures of I/O fibers to determine optical alignment of the signal beams. A fiber coupler 1320 is used to tap a small fraction, e.g., several percent, of the received signal beam 1301 from the output fiber 1312, into a fiber 1322. The majority of the optical power 1312 remains in the output fiber 1330. A photodetector 1340 is coupled to the fiber 1322 to receive the taped optical power and to produce an indicator signal 1342. The greater the power coupled into the output fiber 1312 with coupling optics 1310, the smaller the overall alignment error in switching the signal beam 1301. The positions of the reflectors in the switching elements that reflect the beam 1301 in the switching array 1210 should be adjusted to maximize the output power in the output fiber 1312.

The global control circuit 1210 may be operable to offset the position of at least one of the reflectors that reflect the beam 1301 in the switching array 1210 to increase the signal 1342. The offsets in the position of one or more relevant reflectors may be in both orthogonal directions until the positions at which the signal 1342 reaches its maximum. A predetermined adjustment routine may be used to adjust the two or more reflectors in the path of the beam 1301 in the switching array. As illustrated in FIG. 13, the control circuit 1230 receives such an indicator signal from each output fiber and controls the actuators on the respective reflectors that reflect the output beam to that output fiber. Thus, all output power levels at their respective output fibers are maximized.

The above global position sensing techniques need the presence of the signal beams. Alternatively, a designated global servo beam may be generated at each input port of a switching array to substantially overlap with the corresponding signal beam throughout the switching array. Hence, in absence of signal beams, the reflectors in the switching array can still be aligned by using the global servo beams. The wavelength of the alignment beam may be selected to be different from that of the input signal beam and hence can be separated at a respective output port by using a wavelength-selective coupling element. In this case, the front reflector surface of the reflector in each switching element is dichroic to efficiently reflect both the signal and the servo beams. Either the power of the servo beam or its position at a position-sensing photodetector may be used to generate an indicator signal.

FIG. 14 shows a switching array 1400 that uses global servo beams that respectively track the signal beams to implement the global optical position sensing. The system 1400 includes a non-blocking switching array 1410, an input module 1420, an output module 1430, and a global control circuit 1210. At each input, an input fiber 1422 is coupled to a coupling optical module 1424 to direct an input beam 1425 in free space to the switching array 1410. A light source 1426, such as a LED or diode laser, is used to generate an alignment beam 1427 at a wavelength different from the input signal beam 1425. For example, the input signal beam 1425 may be at about 1550 nm while the alignment beam 1427 may be in the spectral range from about 500 nm to about 900 nm. A dichroic beam splitter 1428 is implemented to combine the beams 1425 and 1427 to co-propagate in the switching array 1410. Hence, the direction of the alignment beam 1427 at the output module 1430 represents the direction of the signal beam 1425. The positioning information of the alignment beam 1427 is therefore used to control the relevant reflectors in the switching array 1410.

At each output in the output module 1430, another dichroic beam splitter 1428 is used to separate the alignment beam 1427 from the input signal beam 1425. The input signal beam 1425 is directed into a coupling optical element 1432 and the proper output fiber 1434. The alignment beam 1427, on the other hand, is directed to a position-sensing photodetector 1438 such as a quad detector or an array of photosensing pixels. The photodetector 1438 is positioned and calibrated so that a reference location on its sensing surface can be used to represent a desired alignment for the signal beam 1425 into the output fiber 1434. An indicator signal 1439, representing a deviation from the reference location, is sent to the control circuit 1210 to adjust the relevant reflectors that reflect the beams 1425 and 1427.

Figure 14A:
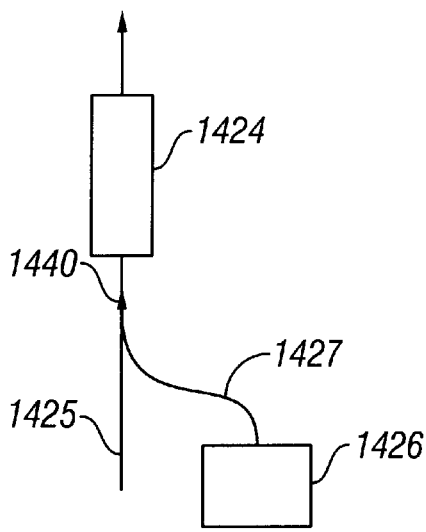

FIG. 14A shows another embodiment for combining the alignment beam 1427 with the input signal beam 1425. A wavelength-selective fiber coupler 1440 is used to couple the alignment beam 1727 into the input fiber 1422. The output of the coupling element 1424 thus has both the signal beam 1425 and the alignment beam 1427.

Figure 14B:
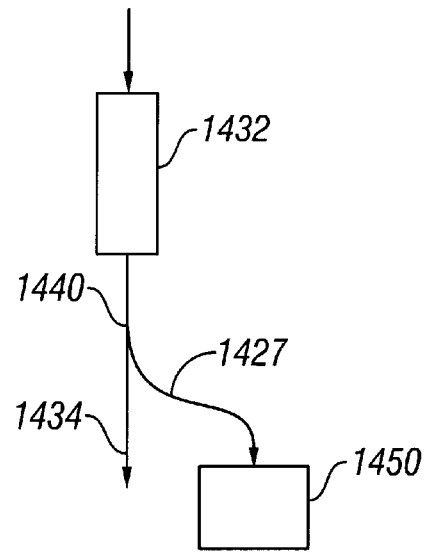

FIG. 14B also shows an alternative embodiment for each output in the output module 1430. The coupling optical element 1432 couples both beams 1425 and 1427 into the output fiber 1434. A wavelength selective fiber coupler 1440 is coupled to the output fiber 1434 to couple only the global servo beam 1427 out to a photodetector 1450 to measure its power. The control circuit 1210 adjusts the relevant reflectors to increase or maximize the output power of the global servo beam 1427. Different from the system in FIG. 13, the global servo beam 1427 has a wavelength different from the signal beam 1425. Hence, the global servo beam 1427 may be selected at a visible or near-infrared wavelength to reduce the cost of the light source 1426 and the detector 1450.

Figure 15:
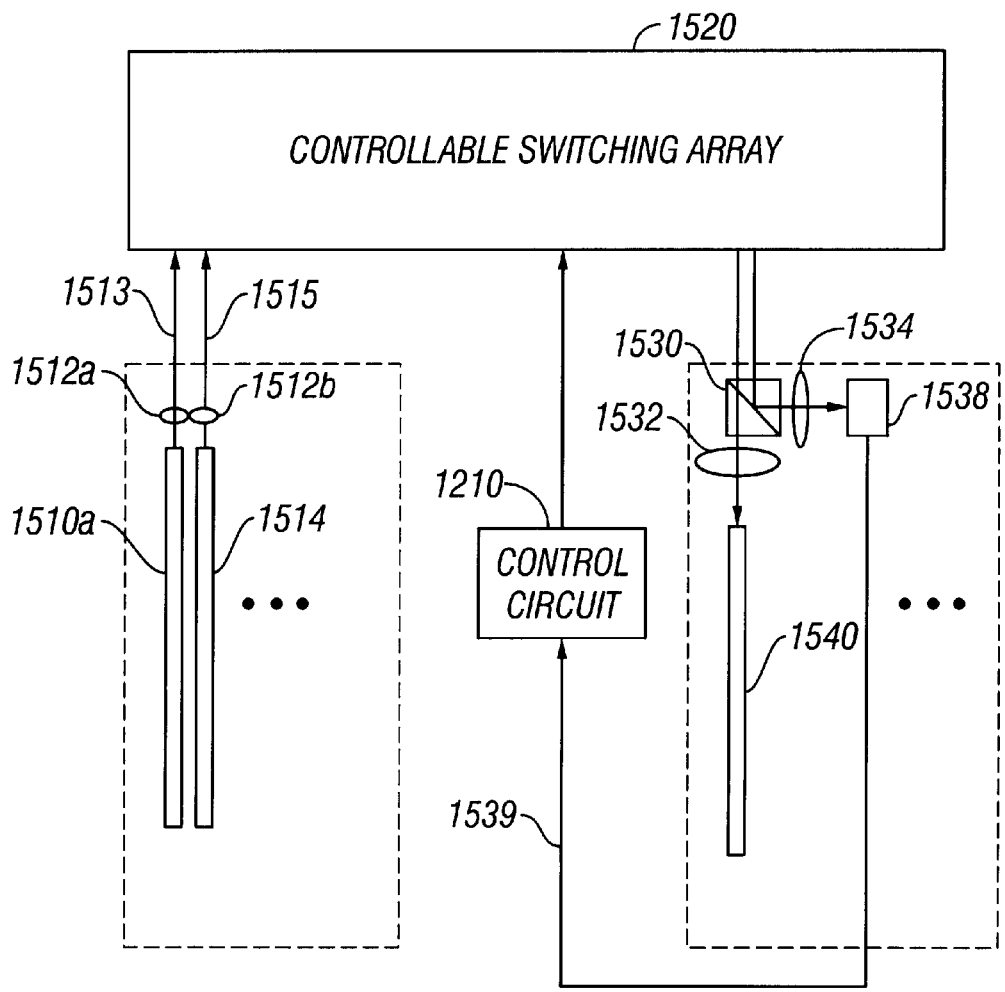

FIG. 15 shows yet another exemplary switching system that uses designated global servo beams to implement the global optical position sensing. Two separate input fibers 1510 and 1514 are arranged in parallel and close to each other to respectively carry an input beam 1513 and a servo beam 1515 at different wavelengths. A signal coupling optical element 1512a such as a lens or microlens is used to direct the signal beam 1513 into the switching array 1520. A servo coupling optical element 1512b is used to direct the servo beam 1515 in parallel to the signal beam 1513 to the switching array 1520. Hence, the beams 1513 and 1515 co-propagate along two slightly displaced and parallel optical paths in the switching array 1520 and are reflected by the same reflectors. At the output for each channel, a dichroic beam splitter 1530 is positioned to receive and split the beams 1513 and 1515 into two different paths. The signal beam 1513 transmits through the beam splitter 1530 and is coupled into the output fiber 1540 via a lens 1532. The servo beam 1515 is reflected by the beam splitter 839 to a position-sensing photodetector 1538 through another lens 1534. A reference location on the sensing surface of the detector 1538 is used to align the servo beam 1515 to hit on a desired location on the detector 1538. This alignment also aligns the signal beam 1513 with respect to the output fiber 1540. A position indicator signal 1539 generated by the detector 1538 is used by the control circuit 1210 to control the relevant reflectors that direct the beams 1513 and 1515. FIG. 15 only illustrates one input and its corresponding output. Other input and output channels may be constructed and operate similarly.

The above combinations of coarse and fine positioning sensing and controlling systems may provide operational advantages over either of the systems when used alone. For example, the local optical position sensing can be used to monitor and control the orientation of each individual reflector to one or more preset orientations. Such local servo control, however, may not be adequate to ensure the proper alignment effectuated by two or more reflectors from an input terminal to a desired output terminal since various changes and variations in the switching system may cause the overall alignment of a particular optical path deviate from what was intended by the preset orientations. The global control, on the other hand, provides a measurement for the alignment error of an entire optical path but does not explicitly indicate the specific alignment error in each reflector in that optical path. The combination of the local and global optical position sensing mechanisms thus can be used to achieve robust optical switching operations with both local and global control.

The systems shown in FIGS. 13 and 14B may also be used to control the amount of optical energy of the signal beam that is coupled into the output fiber 1330 or 1434. Such variable optical coupling is done by adjusting one or more reflectors in the optical path of a signal beam to set its power at a desired value at the output fiber. Hence, the amounts of optical energy of different signal beams to their respective output fibers can be individually adjusted. This mechanism may be used to adjust the relative optical signal levels in different output fibers for, e.g., equalizing the signal strengths of different output WDM channels in a WDM system.

The above optical switching arrays may use the fiber collimator assemblies 100 and 200 respectively shown in FIGS. 1 and 2 to construct the input and output fiber ports. In FIG. 8, for example, each fiber port or terminal in the input and output modules 801 and 802 may be implemented by either the assembly 100 or 200. The reflector in each switch is placed above the surface of a platform at the same height as the center of the collimator lens 140 in the respective fiber collimator assembly which is also mounted on the platform. Hence, the beams from the fibers to the switches are collimated and the collimated beams from the switches can be focused onto the respective fibers.

Figure 16A:
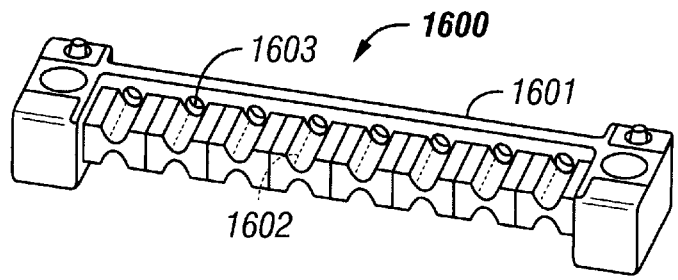
FIGS. 16A, 16B, and 16C show one embodiment of input-output fiber module for an optical switch.
Figure 16B:
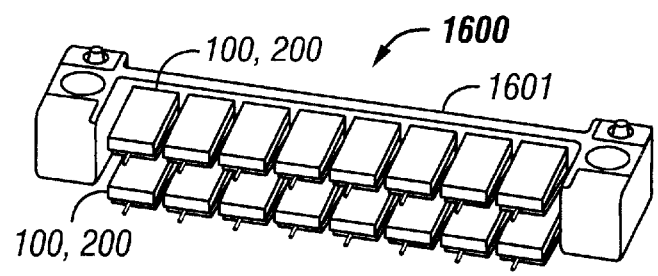
Figure 16C:
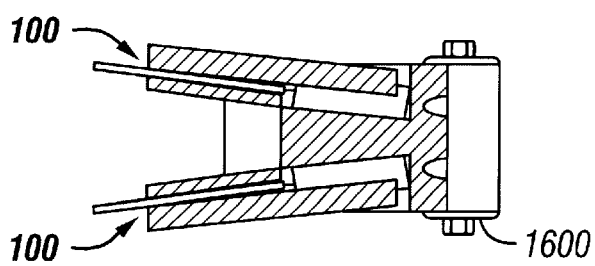

FIG. 16A shows an I/O mount 1600 for holding 8 pairs of angled input and output fiber collimator assemblies based on the design in FIG. 10C where each switching element can be oriented to receive and switch light from two angled fiber ports. The mount 1600 includes 16 receiving ports. Each receiving port includes a groove 1602 to receive and hold the collimator lens 140 of the fiber collimator assembly 100. A back plate 1603 is formed at one side of all 16 grooves 1602 against which collimator assemblies are aligned. A through hole 1603 is formed in the back plate 1601 to transmit light to and from each fiber. FIG. 16B shows the mount 1600 when the fiber collimator assemblies 100 are mounted in the receive ports. FIG. 16C shows a side view of each pair of fiber ports. The mount 1600 may be made symmetric with respect to its center plane and therefore the same mount may be used for both input and output ports.

Free-Space and Integrated Add-Drop Modules

The following describes WDM add-drop modules that process optical signals in free space internally and use fiber ports to input or output optical signals through optical waveguides such as fibers. Such a WDM add-drop module may be easily coupled to another optical fiber device, a fiber, or a fiber system. In addition, the advantages of the low optical loss and the flexibility of the free-space optical configuration may be used to reduce optical loss and save space. Such WDM modules may be generally designed to include at least four fiber ports that are respectively coupled to receive an input optical signal with multiple WDM channels, to drop a WDM channel at a selected wavelength, to add a new WDM channel at the selected wavelength, and to export an output signal that with multiple channels. The output signal may have a void at the channel of the selected wavelength if no new channel at the selected wavelength is added. The output signal may also have a new channel at the selected wavelength for replacing an old input channel at the selected wavelength or filling the void in the input signal.

Figure 17:
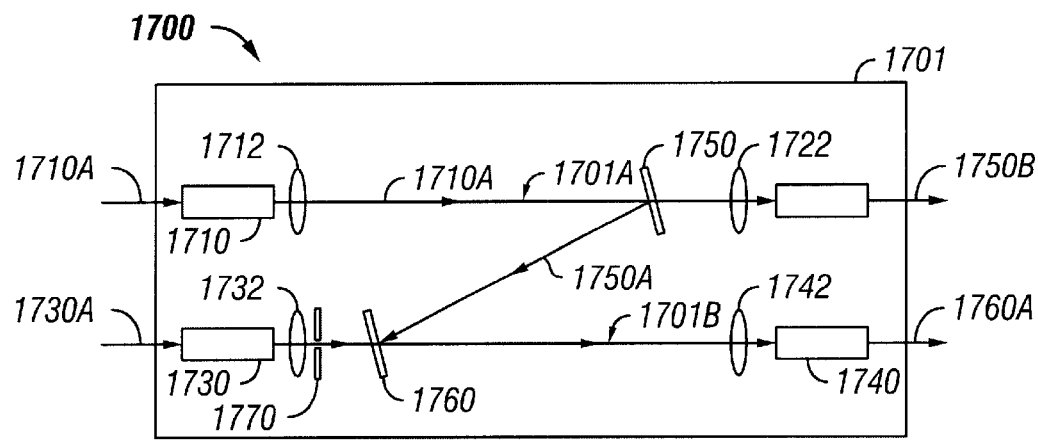
FIG. 17 shows one embodiment of a 4-port WDM add-drop module that uses two optical bandpass filters with the same transmissive center wavelength for adding, dropping, or exchanging a WDM channel.

FIG. 17 shows one embodiment of a 4-port WDM add-drop module 1700 which includes two optical bandpass filters 1750 and 1760. A support base 1701 is provided to support and hold various elements of the module 1700, including, the filters 1750 and 1760, an input fiber port 1710, an output fiber port 1740, a drop fiber port 1720, and an add fiber port 1730. Semiconductor materials, metals, and other suitable solid state materials may be used to form the support base 1701. Each fiber port may be a fiber segment or a distal portion of a fiber for receiving or exporting an optical signal. Collimator lenses 1712, 1722, 1732, and 1742 are mounted to the base 1701 and are respectively positioned at the fiber ports 1710, 1720, 1730, and 1740 to couple optical signals into or out of the fiber ports. More specifically, each collimator lens is configured to collimate an output beam from a respective fiber port and to focus a collimated beam incident to the lens into the respective fiber port. The WDM add-drop module 1700 is designed to add or drop a WDM channel at a common selected WDM wavelength.

Figure 18:
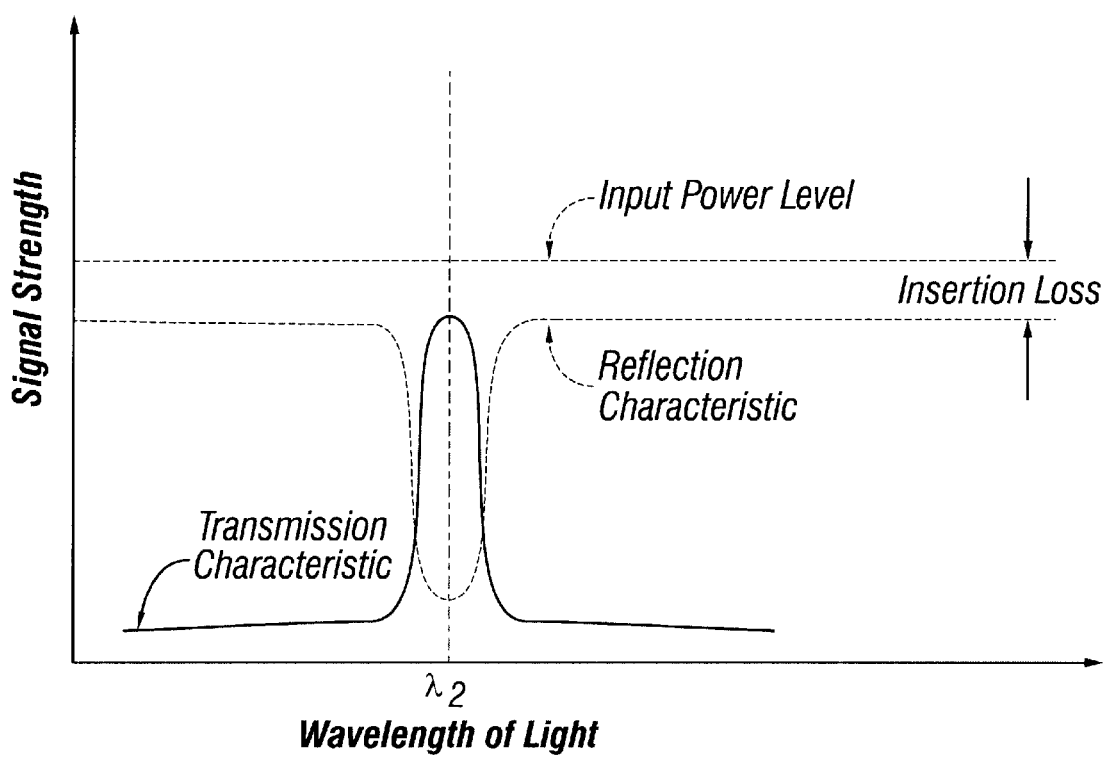
FIG. 18 shows the reflective and transmissive spectra of the optical bandpass filters used in FIG. 1.

The bandpass filters 1750 and 1760 are operable to transmit light at the common selected center wavelength, e.g., at a wavelength $\lambda_2$, with a given transmission bandwidth and to reflect light at other wavelengths. The two opposite surfaces of each filter may be planar surfaces so that the reflective angle of the reflected light is equal to the incident angle of the input light to the filter. FIG. 18 illustrates the reflective and transmissive spectra of the filters 1750 and 1760. The transmissive bandwidth is sufficiently narrow to transmit one WDM channel while reflecting other WDM channels. Examples for the filters 1750 and 1760 include, among others, thin-film multi-layer interference filters or Fabry-Perot filters. In general, the transmissive center wavelength of such filters is a function of the incident angle of light, hence, if two filters 1750 and 1760 are identical in structure, they should be oriented to receive input light at about the same incident angle so their transmission center wavelengths are substantially equal.

The input fiber port 1710, the lens 1712, the filter 1750, the lens 1722, and the drop fiber port 1720 may be arranged on the base 1701 along a first common optic axis so that an input optical signal 1710A received by the fiber port 1710 can be collimated by the lens 1712 and directed to the filter 1750. If a portion 1750B of the signal 1710A is at the selected wavelength $\lambda_2$, this portion 1750B can be received by the lens 1722 and focused into the drop fiber port 1720 to produce a drop signal 1750B. Similarly, the add fiber port 1730, the lens 1732, the filter 1760, the lens 1742, and the output fiber port 1740 may be arranged on the base 1701 along another second common optic axis so that an input optical signal 1730A at the selected wavelength $\lambda_2$ received by the fiber port 1730 can be collimated by the lens 1732 and directed to the filter 1750 to transmit through the filter 1760. The lens 1742 receives the transmitted light from the fiber port 1730 and focuses it into the output fiber port 1740 to produce an output signal 1760A.

Notably, the filter 1750 is oriented with respect to the first common optical axis so that remaining portion 1750A of the signal 1710A at wavelengths other than $\lambda_2$ is reflected by the filter 1750 to the second filter 1760 in the second common optical axis. The reflected signal 1750A will also be reflected by the filter 1760 because it is designed and oriented relative to the filter 1750 to transmit light at $\lambda_2$ and reflect light at other wavelengths. In particular, the filter 1760 is oriented to reflect the beam 1750A to propagate along the second common optical axis and hence is focused by the lens 1742 into the output fiber port 1740.

The WDM add-drop module 1700 may be controlled to operate as follows. Assume that the input fiber port 1710 receives the input signal 1710A having WDM channels at different WDM wavelengths $\lambda_1, \lambda_2, \lambda_3, \ldots$, respectively. The signal 1710A is then received by the lens 1712 and becomes collimated. The filter 1750 receives and processes the collimated beam 1710A by reflecting the WDM channels at the wavelengths $\lambda_1, \lambda_3, \lambda_4, \ldots$ as the reflected beam 1750A and transmitting the WDM channel at $\lambda_2$ as a transmitted collimated beam 1750B to the lens 1722. The reflected collimated beam 1750A is reflected twice by filters 1750 and 1760 and is focused into the output fiber port 1740 by the lens 1742 as an output signal 1760A. In the above process, the channel 1750B is dropped out at the port 1720 while other channels are exported at the port 1740.

The module 1700 may use the add port 1730 and the filter 1760 to add a new channel at the transmissive wavelength $\lambda_2$ of the filter 1760 to the output 1760A. This is accomplished by sending an input beam 1730A at the wavelength $\lambda_2$ that carries the new channel into the WDM module 1700. The beam 1730A, after being collimated by the lens 1732 and transmitting through the filter 1760, is combined with the reflected beam 1750A to form the final output beam 1760A. If the input signal 1710 does not have a channel at $\lambda_2$, the signal 1730A will be added at $\lambda_2$; if the input signal 1710A does have an input channel $\lambda_2$, this input channel will be dropped by the filter 1750 at the drop fiber port 1720 and in exchange, the new channel 1730A at $\lambda_2$ will be added. Therefore, the WDM element 1700 is operable to add a WDM channel at $\lambda_2$ to the output fiber port 1740 when the input beam 1710A has a void at the wavelength $\lambda_2$, to drop an input WDM channel at $\lambda_2$, or to exchange the input channel at $\lambda_2$ with a new channel at $\lambda_2$ from the add fiber port 1730.

The WDM add-drop module 1700 may also include a variable optical attenuator 1770 in the optical path of the signal 1730A between the fiber port 1730 and the filter 1760, e.g., between the lens 1732 and the filter 1760 as shown. The power level of the signal 1730A hence may be adjusted to a desired power level when being added to the signal 1750A to form the output signal 1760A. The attenuator 1770 may be an adjustable optical aperture such as an iris with a suitable geometry or a knife edge. In operation, the power level of the beam 1730A is adjusted through a partial blocking by the aperture 1770. The position of the aperture 1770 may be controlled either manually or automatically using an aperture control mechanism.

Figure 19A:
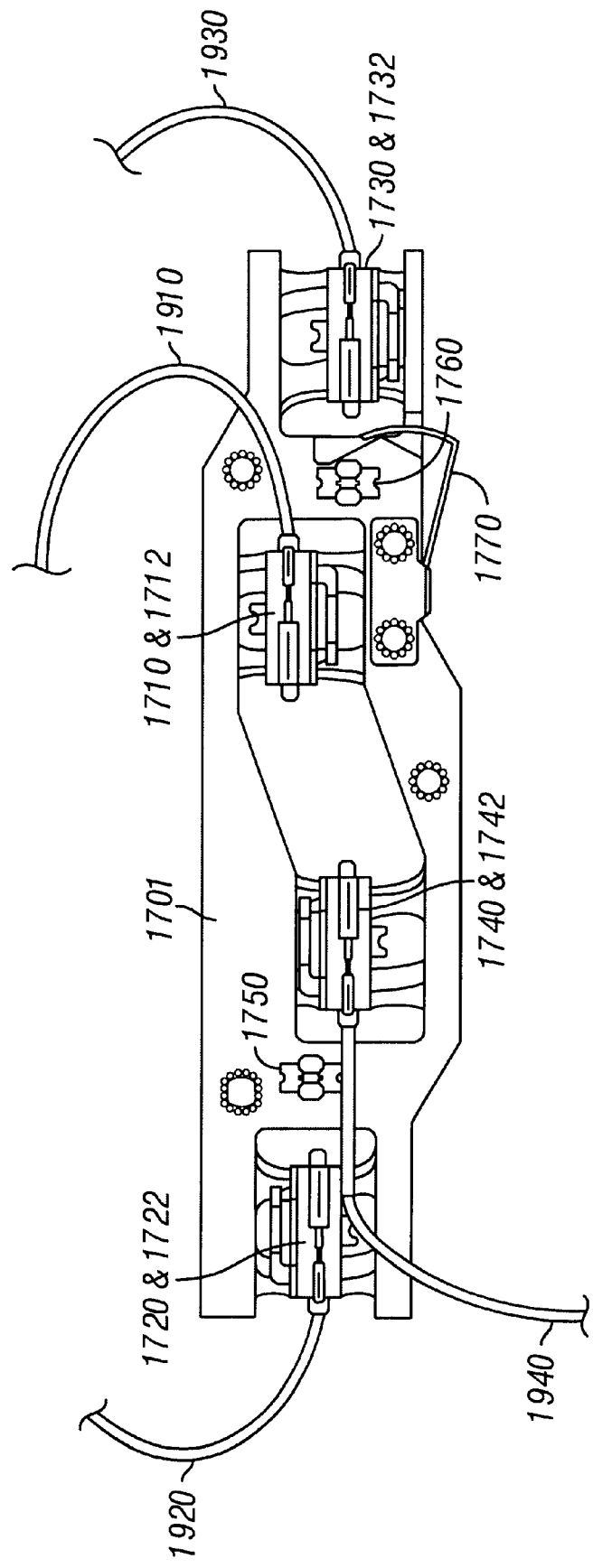
FIG. 19A shows one implementation of the 4-port WDM add-drop module based on the design in FIG. 17.
Figure 19B:
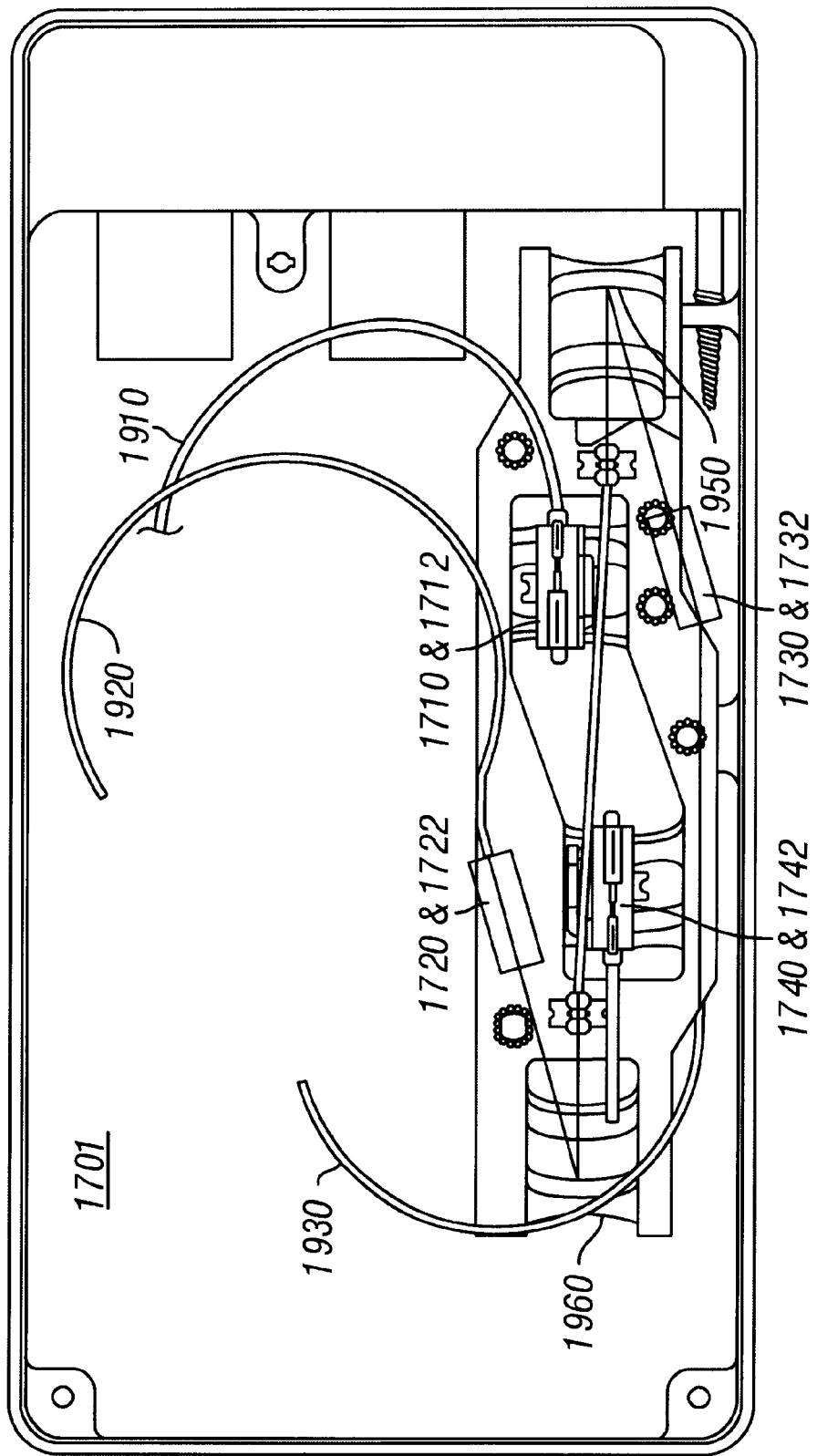
FIG. 19B shows another implementation of the 4-port WDM add-drop module based on the design in FIG. 17, where two optical reflectors are used to reduce the overall size of the module.

FIGS. 19A and 19B show two implementations of the device 1700 in FIG. 17. The implementation in FIG. 19A essentially follows the layout of the device 1700 in FIG. 17. When fibers 1910, 1920, 1930, and 1940 are coupled to the fiber ports 1710, 1720, 1730, and 1740, respectively, the fibers 1910, 1920, 1930, and 1940 may be bent or rolled into a loop to fit into the device package. A fiber, however, is known to leak optical energy when so bent as one form of optical loss and the degree of leakage increases as the radius of the bent portion of the fiber decreases. Therefore, the radius of a bent portion of the fiber may not be less than a minimum radius in order to maintain the optical loss below an acceptable level. This requirement places a lower limit in the physical size of the device.

The implementation shown in FIG. 19B takes the advantage of the freedom in directing light of the free-space optical layout within the device 1700. Two optical reflectors 1950 and 1960 are used to change the directions of the beams 1750B and 1730A and relocate the positions of the fiber ports 1720 and 1730 along with their respective collimator lenses 1722 and 1732. Hence, when the positions of the fiber ports 1720 and 1730 are properly selected, the coupled fibers can be positioned to save space without compromising the requirement of the lower limit on the radius of the bent fibers. The use of reflectors 1950 and 1960 increases the internal optical path lengths of the signals without increasing the internal optical loss of the device since both reflectors 1950 and 1960 may be made highly reflective and light propagation in free space essentially has no loss. In comparison, an increase in the optical path length in a bent fiber may significantly increase the optical loss due to the optical leakage in the bent fiber portions. It has shown that the device implementation in FIG. 3B could save about 30% space in comparison with the device implementation in FIG. 3A and hence may be preferable when it is desirable to have a compact device.

Figure 20A:
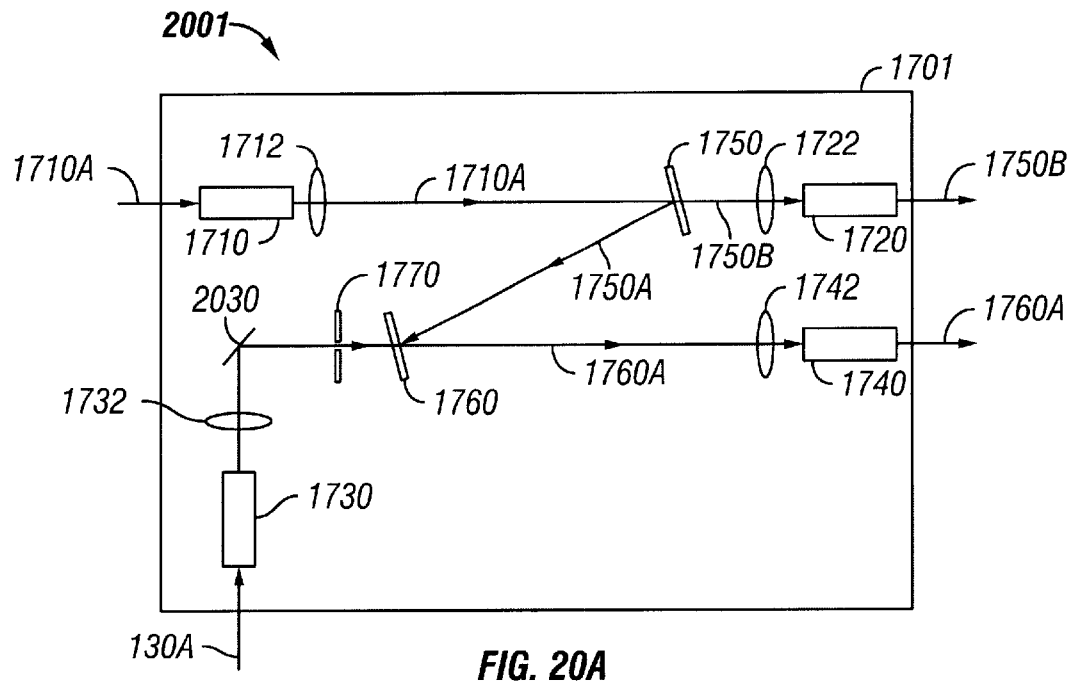
FIGS. 20A and 20B show other implementations of the 4-port WDM add-drop module based on the design in FIG. 17, where one or more optical reflectors are used to reduce the overall size of the module.
Figure 20B:
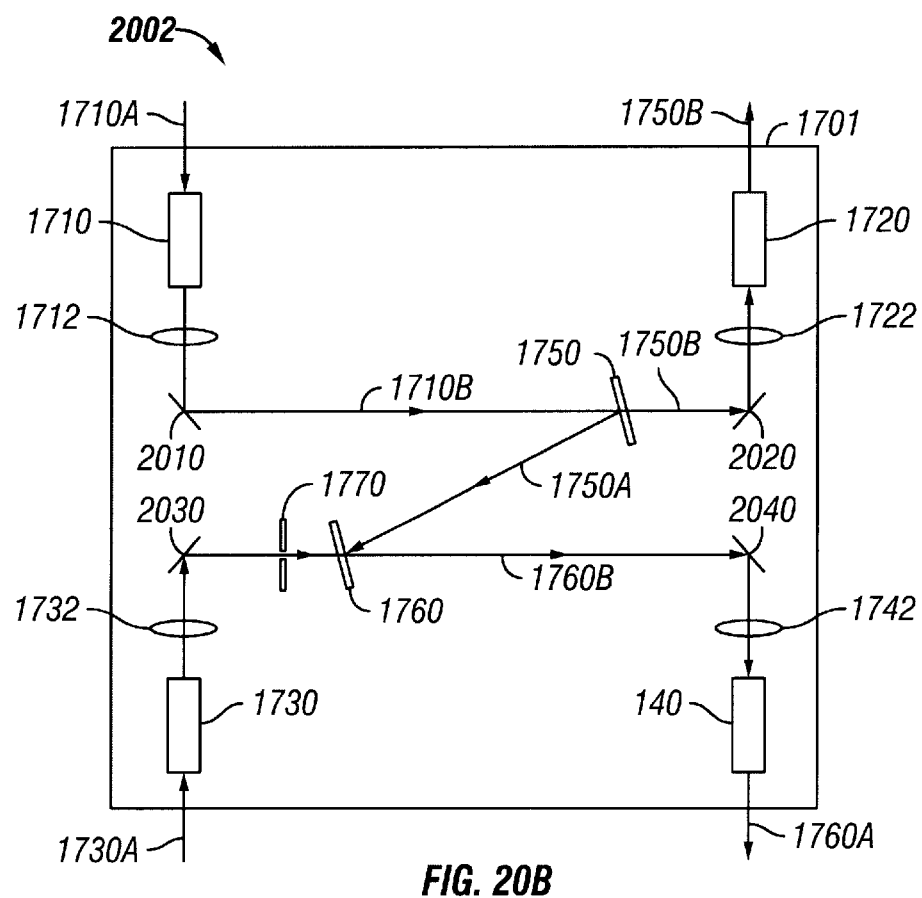

FIGS. 20A and 20B show two additional examples 2001 and 2002 where one or more reflectors may be used to place one or more fiber ports and their associated collimator lenses at suitable locations on the base 1701 to either reduce the overall device size or facilitate the interface with an external fiber or fiber device. In FIG. 20A, a reflector 2030 is used to relocate the add fiber port 1730 and the lens 1732. In FIG. 20B, four reflectors 2010, 2020, 2030, and 2040 are used to relocate all four fiber ports and their lenses.

Figure 21:
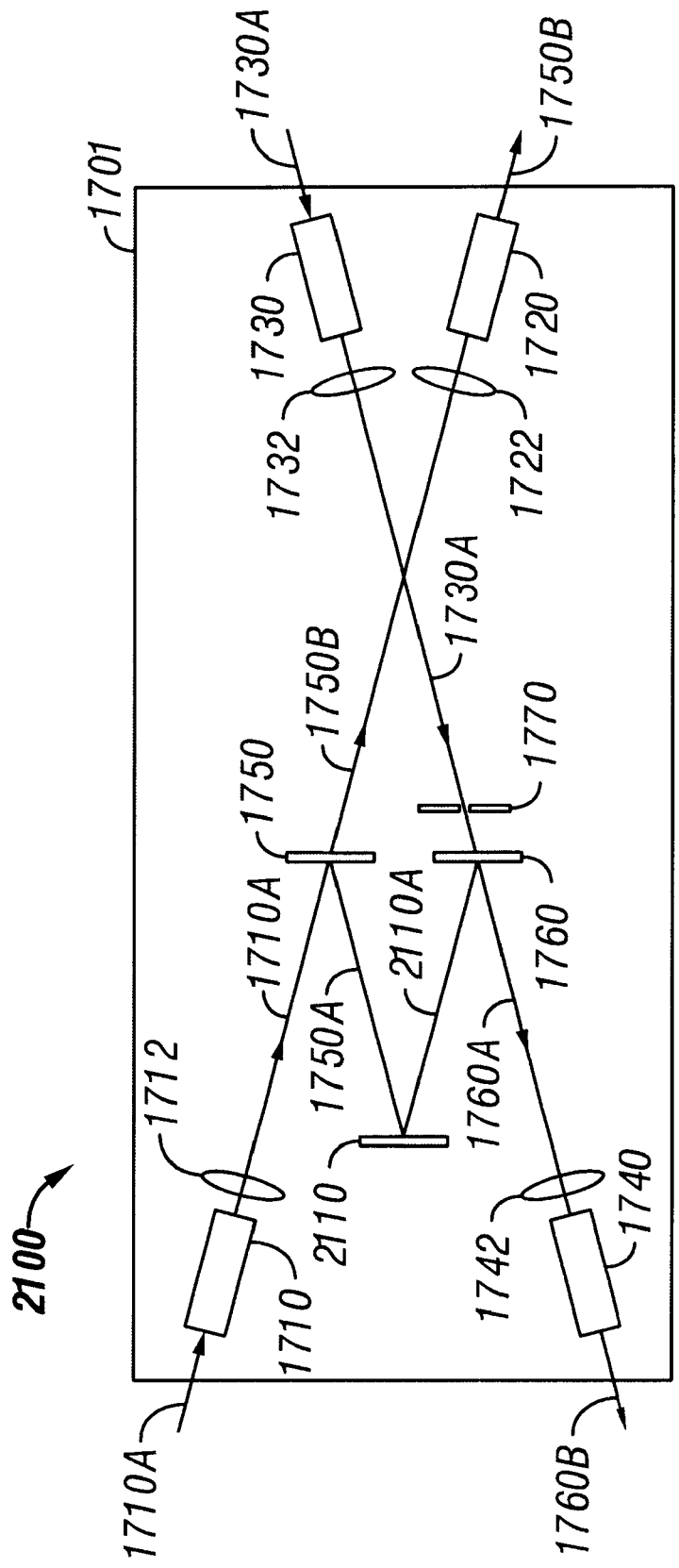
FIGS. 21, 22, and 23 show exemplary embodiments of a 4-port WDM add-drop module that uses three optical bandpass filters with the same transmissive center wavelength for adding, dropping, or exchanging a WDM channel.
Figure 22:
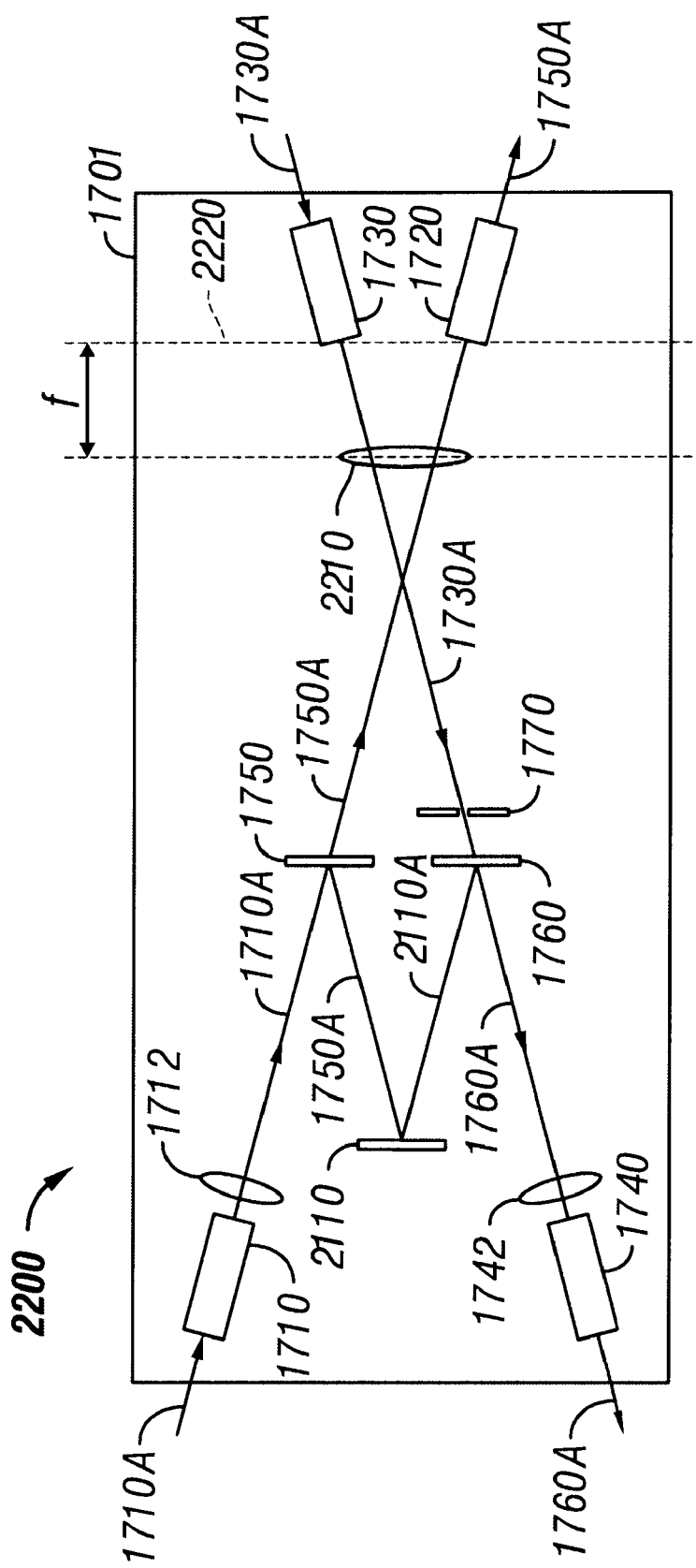
Figure 23:
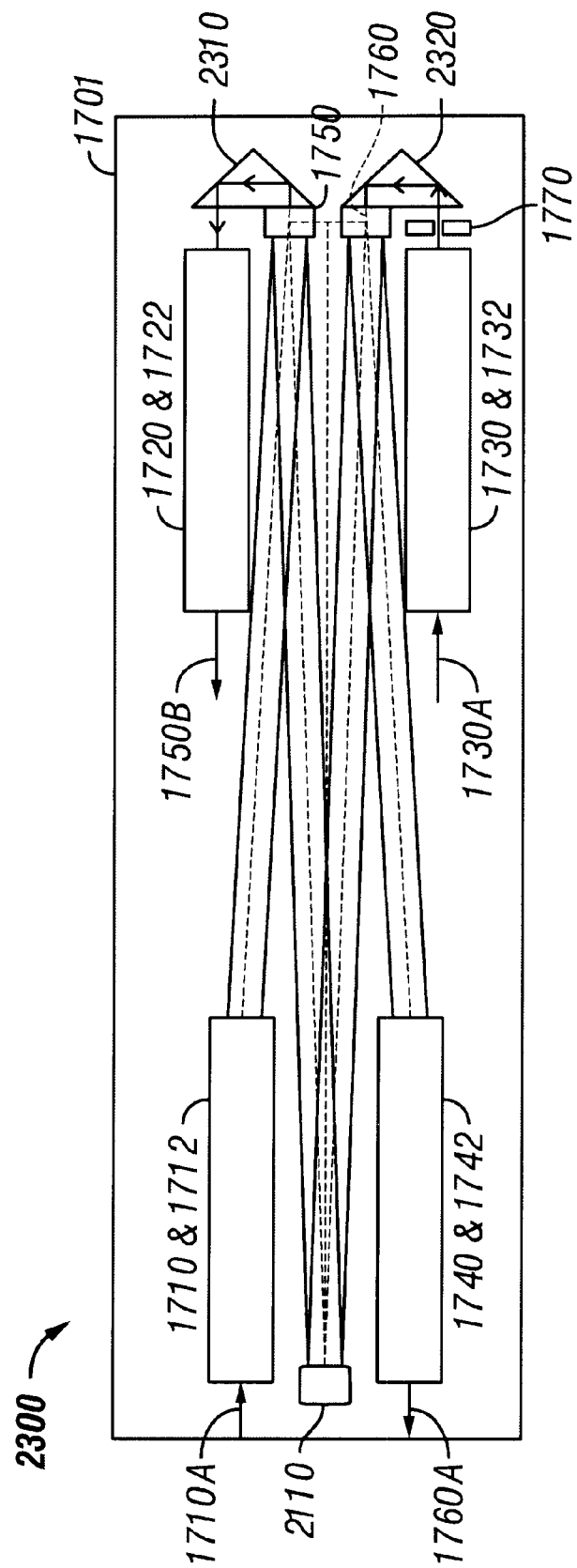

FIGS. 21, 22, and 23 respectively show embodiments of 4-port WDM add-drop modules 2100, 2200, and 2300 that use three optical bandpass filters 1750, 1760, and 2110. The filter 2110 is configured and operable to transmit the same selected transmissive wavelength and reflect other wavelengths as the filters 1750 and 1760. The filter 2110 is located in the optical path between the filters 1750 and 1760 to reflect the reflected beam 1750A from the filter 1750 as a beam 2110A to the filter 1760. The filter 1760 then reflects the beam 2110A one more time to direct it to the output fiber port 1740. Hence, the reflected WDM channels in the input signal 1710A are reflected three times when they reach the output fiber port 1740 as a portion or the entirety of the output signal 1760A. The resultant spectrum after the three reflections is the product of the reflective spectra of the filters 1750, 2110, and 1760. Hence, any residual signal from the dropped signal 1750B at the filter 1750 is further suppressed by the filters 2110 and 1760. Therefore, when a new channel at the dropped channel wavelength is added at the filter 1760, the additional filter 2110 improves the channel isolation between the dropped channel 1750B and the added channel 1730A. In principle, more than three filters may be used if additional suppression of the residual signal from the dropped channel is desired.

When the three filters 1750, 2110, and 1760 are substantially identical in their filter structures, they are arranged relative to each other so that the incident angle of the beam 1710A to the filter 1750, the incident angle of the beam 1750A to the filter 2110, and the incident angle of the 2110A to the filter 1760 should be substantially the same. Under this condition, the filter spectra of the three filters 1750, 2110, and 1760 can substantially match one another at the selected transmissive wavelength. As illustrated in FIGS. 21 and 22, and 23, under this condition, the beam 1750B transmitting through the filter 1750 for the dropped channel forms an angle with respect to the beam 1730A for the added channel incident to the filter 1760. Accordingly, the embodiments 2100 and 2200 in FIGS. 21 and 22 position the fiber ports 1720 and 1730 at the same relative angle with respect to each other. In FIG. 21, two separate collimator lenses 1722 and 1732 are respectively placed in front of the fiber ports 1720 and 1730. In FIG. 22, a common collimator lens 2210 is used for collimation for both fiber ports 1720 and 1730. The facets of the fiber ports 1720 and 1730 are located in the focal plane 2220 of the lens 2210 and form the desired relative angle.

The embodiment 2300 in FIG. 23 uses two prism reflectors 2310 and 2320 to direct the beams 1750B and 1730A so that the fiber ports 1720, 1730 and their respective collimator lenses 1722 and 1732 may be relocated on the base 1701 to reduce the device size. Each prism reflector has two reflective surfaces to reflect a beam twice. Alternatively, two mirror reflectors may be used to replace the prism reflector. This scheme may also be used in the two-filter WDM add-drop devices shown in FIGS. 17 through 20B.

Figure 24:
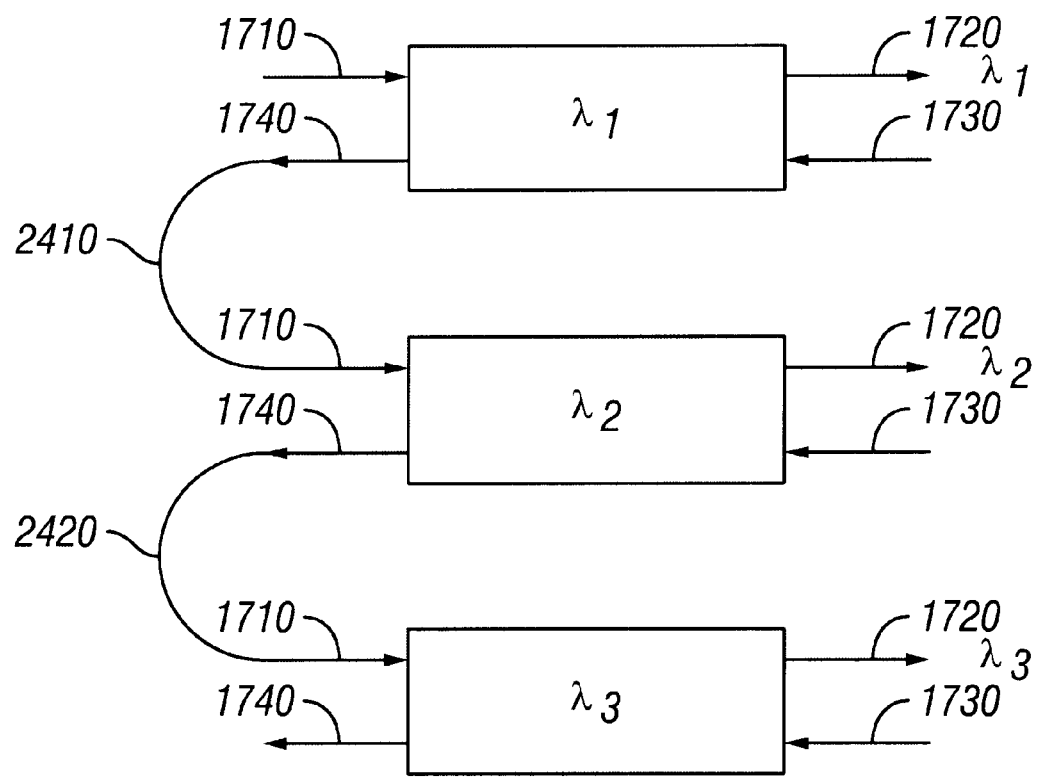
FIG. 24 shows a WDM processing system using two or more add-drop modules.

Two or more 4-port WDM add-drop modules based on any of the above embodiments or their variations may be used as building blocks to form a variety of WDM devices. FIG. 24 shows one exemplary WDM device that uses three different WDM modules at different wavelengths $\lambda_1$, $\lambda_2$, and $\lambda_3$, respectively. A fiber 2410 is coupled to direct signals from the output fiber port 1740 of the first WDM module at $\lambda_1$, into the input fiber port 1710 of the second WDM module $\lambda_2$. Another fiber 2420 is coupled to direct signals from the output fiber port 1740 of the second WDM module $\lambda_3$ into the input fiber port 1710 of the third WDM module $\lambda_3$. This device allows for dropping, adding, or exchanging any channels at the wavelengths $\lambda_1$, $\lambda_2$, and $\lambda_3$. In principle, any number of such WDM modules may be so combined to provide versatile operations for adding, dropping, or exchanging channels at different wavelengths.

Figure 25:
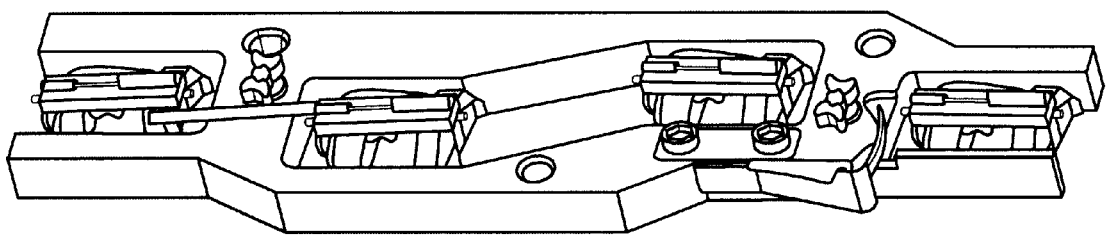
FIG. 25 shows a device implementation of the module shown in FIG. 17 by using the fiber collimator assembly in FIG. 1 as each fiber port and its respective collimator lens.

In the above add-drop modules, each fiber port and its collimating lens may be implemented by using the fiber collimator assembly 100 in FIG. 1 or 200 in FIG. 2. Each collimator assembly 100 or 200 can be mounted on the support base 1701 to tilt each angle-polished fiber with respect the support base 1701 so that its output beam is substantially parallel to the support base 1701. FIG. 25 shows one device implementation of the module 1700 shown in FIG. 17 where the fiber collimator assembly 100 in FIG. 1 is used for each fiber port.

Although the present disclosure only includes a few embodiments, other modifications and enhancements may be made without departing from the following claims.

What is claimed is:

1. A device, comprising:

a light source configured to produce a light beam;

a fiber coupler module having a collimator lens which defines a collimator optic axis and a fiber which has one end facet facing said collimator lens and forms an angle with respect to a fiber optic axis of said fiber, said collimator lens positioned to couple said light beam into said fiber through said end facet, wherein said fiber coupler module is configured to hold said fiber at a tilted angle with respect to said collimator optic axis so that an output beam from said fiber is received and collimated by said collimator lens to propagate along said collimator optic axis, and wherein said fiber coupler module includes:

a receiving port to hold at least a portion of said collimator lens, a first substrate fabricated to have a first groove to which said collimator lens is engaged, and a second substrate fabricated to have a second groove to hold said fiber in parallel to said second substrate, said second substrate engaged to said first substrate at said tilted angle to place said end facet of said fiber to face said collimator lens;

a support module having a first part to mount said light source and a second part with a support platform over which said fiber coupler module is positioned in optical alignment with said light source, said support platform having a top surface facing said fiber coupler module and first and second opposing side surfaces substantially parallel to an optical path of said light beam;

first and second vertical elongated engagement members having first distal ends affixed to said first side surface to space from each other and second distal ends affixed to said fiber coupler module;

a third vertical elongated engagement member having a first distal end affixed to said second side surface in a position between positions of said first and second vertical elongated engagement members along said optical path of said light beam, said third vertical elongated engagement member having a second distal end affixed to said fiber coupler module;

a first horizontal engagement member having a first part engaged to said fiber coupler module and a second part elongated in a direction nominally perpendicular to said first and second side surfaces and engaged to said support platform at a first location close to said first side surface; and a second horizontal engagement member having a first part engaged to said fiber coupler module at a location different from said first horizontal engagement member, and having a second part elongated in a direction nominally parallel to said second elongated part of said first horizontal engagement member and engaged to said support platform at a second location close to said second side surface.

2. The device as in claim 1, wherein each engagement member is slightly deflected to apply a pressure towards said fiber coupler module.

3. The device as in claim 1, wherein said fiber coupler module includes a housing and said collimator lens is directly engaged to a surface of said housing.

4. The device as in claim 3, wherein said housing includes a cylindrical through channel to transmit said light beam and to hold at least a portion of said collimator lens.

5. The device as in claim 3, wherein said fiber coupler module includes a fiber fitting unit to engage said fiber to said housing with said tilted angle.

6. The device as in claim 5, wherein said fiber fitting unit includes a fiber sleeve that forms said tilted angle with respect to said collimator optic axis and holds said fiber.

7. The device as in claim 1, further comprising at least two ball members with different diameters positioned between and engaged to said first and said second substrates to tilt said second substrate at said tiled angle.

8. A device, comprising:
   a switching element to direct an optical signal beam to one or more switching directions;
   a fiber with an angle-polished end facet positioned to send said optical signal beam to or receive said optical signal beam from said switching element;
   a fiber coupler module holding said fiber and a collimator lens in an optical path between said angle-polished end facet and said switching element, wherein said fiber coupler module is configured to hold said fiber at a tilted angle with respect to a collimator optic axis of said collimator lens so that an output beam from said fiber is received and collimated by said collimator lens to propagate along said collimator optic axis;
   an optical position sensor adopted to use an optical servo beam to measure a property of said switching element to produce a position signal indicative of a deviation between an actual switching direction and a desired switching direction of said signal beam;
   a control unit to respond to said position signal to control said switching element so as to reduce said deviation to direct said signal beam substantially in said desired switching direction; and
   another optical position sensor coupled to said optical fiber coupler module to measure a position of said signal beam on said angle-polished end facet to produce a second position signal,
   wherein said switching element is operable to respond to said second position signal to further control said actual switching direction of said signal beam to direct said signal beam at a desired position on said angle-polished end facet.

9. The device as in claim 8, wherein said signal beam has a wavelength different from a wavelength of said servo beam.

10. The device as in claim 8, wherein said switching element includes a reflector having a signal reflective surface to reflect said signal beam and a servo reflective surface to reflect said servo beam, and an actuator coupled to adjust and control an orientation of said reflector.

11. The device as in claim 10, wherein said optical position sensor includes a light source to generate said servo beam to said reflector and a position-sensing photodetector to measure a position of said servo beam upon reflection from said reflector, said photodetector operable to produce said position signal.

12. The device as in claim 11, wherein said photodetector includes discrete photosensing areas.

13. The device as in claim 11, wherein said photodetector includes a PIN photodiode with at least one uniform, resistive surface to provide continuous position data.

14. The device as in claim 10, wherein said actuator is operable to adjust said orientation of said reflector around a single rotation axis.

15. The device as in claim 10, wherein said actuator is operable to adjust said orientation of said reflector around two different rotation axes.

16. The device as in claim 10, wherein said actuator includes a galvanometer or a MEMS actuator.

17. The device as in claim 8, wherein said second optical position sensor includes:
   an optical coupler coupled to said fiber to split a portion of optical energy received by said angle-polished end facet;
   a photodetector to receive said portion of optical energy to produce a detector signal indicating an amount of said optical energy received by said angle-polished end facet.

18. The device as in claim 17, wherein said portion includes an optical servo beam at a wavelength different a signal wavelength of a signal beam in said optical beam, and wherein said optical coupler is a dichroic optical coupler.

19. The device as in claim 17, wherein said portion is a part of said signal beam.

20. The device as in claim 8, wherein said fiber coupler module includes a fiber fitting unit to engage said fiber with said tilted angle.

21. The device as in claim 20, wherein said fiber fitting unit includes a fiber sleeve that forms said tilted angle with respect to said collimator optic axis and holds said fiber.

22. The device as in claim 8, wherein said fiber coupler module includes:
   a receiving port to hold at least a portion of said collimator lens;
   a first substrate fabricated to have a first groove to which said collimator lens is engaged; and
   a second substrate fabricated to have a second groove to hold said fiber in parallel to said second substrate, said second substrate engaged to said first substrate at said tilted angle to place said angle-polished end facet of said fiber to face said collimator lens.

23. The device as in claim 22, wherein said fiber coupler module further comprises at least two ball members with different diameters positioned between and engaged to said first and said second substrates to tilt said second substrate at said tiled angle.

24. A device, comprising:
   a first array of switching elements and a second array of switching elements, each switching element operable to direct a signal beam from one direction to another direction, wherein each switching element in one of said first and said second arrays is operable to direct an incident beam to each and every switching element in another of said first and said second arrays;
   a first optical position sensor to use at least a first optical servo beam to measure a property of each switching element in said first array to produce a first position signal indicative of a deviation between an actual switching direction and a desired switching direction of a first signal beam received by said each switching element in said first array;

a second optical position sensor to use at least a second optical servo beam to measure a property of each switching element in said second array to produce a second position signal indicative of a deviation between an actual switching direction and a desired switching direction of a second signal beam received by said each switching element in said second array, wherein each switching element in said first array is operable to reduce said deviation to direct said first signal beam substantially in said desired switching direction, and wherein each switching element in said second array is operable to reduce said deviation to direct said second signal beam substantially in said desired switching direction;

a first array of fiber ports positioned to optically communicate with said first array of switching elements and configured to hold fibers with angle-polished end facets respectively facing said first array of switching elements;

a second array of fiber ports positioned to optically communicate with said second array of switching elements and configured to hold fibers with angle-polished end facets respectively facing said second array of switching elements, wherein each fiber port includes a collimator lens in an optical path between an angle-polished end facet of a respective fiber and a respective switching element and is configured to hold said respective fiber at a tilted angle with respect to a collimator optic axis of said collimator lens so that an output beam from said fiber is received and collimated by said collimator lens to propagate along said collimator optic axis; and a terminal optical position sensor coupled to a fiber port, which receives said output signal beam, to measure a position of said output signal beam on said angle-polished end facet of a respective fiber to produce a terminal position signal, wherein at least one of said switching element in said first array and said switching element in said second array is operable to respond to said terminal position signal to further direct a direction of said output signal beam to a desired position on said fiber port.

25. The device as in claim 24, wherein an input signal beam is directed once by one switching element in said first array and once by a switching element in said second array to produce an output signal beam at a desired output direction.

26. The device as in claim 24, wherein each switching element includes a reflector that has a first reflective surface to reflect a signal beam and a second reflective surface to reflect a servo beam, wherein each of said first and said second optical position sensors includes:

a light source to produce said servo beam; and a photodetector having a position-sensing surface to receive said servo beam reflected from said second reflective surface and to produce a position signal.

27. The device as in claim 26, wherein each of said first and said second optical position sensor includes a beam splitter positioned to direct said servo beam from said light source to said second reflective surface and to direct said servo beam reflected from said second reflective surface to said photodetector.

28. The device as in claim 27, wherein said servo beam is linearly polarized and said beam splitter is a polarization beam splitter, wherein each optical position sensor further includes a polarization rotator to rotate a polarization of said servo beam reflected by said second reflective surface by about 90 degrees from a polarization of said servo beam incident to said second reflective surface.

29. The device as in claim 26, wherein each switching element includes an actuator engaged to said reflector to adjust an orientation of said reflector in two orthogonal directions.

30. The device as in claim 29, wherein said actuator includes a galvanometer.

31. The device as in claim 24, each switching element in said first and said second arrays is operable to adjust a direction of a beam in two orthogonal directions.

32. The device as in claim 24, wherein each fiber port includes a fiber fitting unit to engage said fiber with said tilted angle.

33. The device as in claim 32, wherein said fiber fitting unit includes a fiber sleeve that forms said tilted angle with respect to said collimator optic axis and holds said fiber.

34. The device as in claim 24, wherein each fiber port includes:

a receiving port to hold at least a portion of said collimator lens;

a first substrate fabricated to have a first groove to which said collimator lens is engaged; and a second substrate fabricated to have a second groove to hold said fiber in parallel to said second substrate, said second substrate engaged to said first substrate at said tilted angle to place said angle-polished end facet of said fiber to face said collimator lens.

35. The device as in claim 34, wherein each fiber port further comprises at least two ball members with different diameters positioned between and engaged to said first and said second substrates to tilt said second substrate at said tiled angle.

36. A device, comprising:

a first optical bandpass filter operable to receive an input optical signal with a plurality of wavelength-division multiplexed (WDM) channels and to transmit light at a transmission wavelength to produce a drop-channel beam while reflecting light at other wavelengths to produce a first reflected beam;

a second optical bandpass filter operable to transmit light at said transmission wavelength and to reflect light at other wavelengths, said second optical bandpass filter positioned to receive and reflect said first reflected optical beam from said first optical bandpass filter through free space as a second reflected optical beam, wherein said second optical bandpass filter is operable to receive and transmit an add-channel beam at said transmission wavelength to merge into said second reflected optical beam;

an input fiber port engaged to an input fiber which carries said input optical signal and positioned to send said input optical signals to said first optical bandpass filter;

a drop fiber port engaged to a drop fiber and positioned to receive said drop-channel beam;

an add fiber port engaged to an add fiber which is operable to carry said add-channel beam and positioned to send said add-channel beam to said second optical bandpass filter; and an output fiber port engaged to an output fiber and positioned to receive second reflected optical beam, wherein each fiber port has a collimator lens which defines a collimator optic axis, and each fiber has one end facet facing said collimator lens and forms an angle with respect to a fiber optic axis of said fiber, each collimator lens positioned in an optical path between a respective optical bandpass filter and a respective fiber wherein each fiber port is configured to hold said fiber at a tilted angle with respect to said collimator optic axis so that an output beam from said fiber is received and collimated by said collimator lens to propagate along said collimator optic axis, and wherein each fiber port includes:
- a receiving port to hold at least a portion of said collimator lens;
- a first substrate fabricated to have a first groove to which said collimator lens is engaged; and
- a second substrate fabricated to have a second groove to hold said fiber in parallel to said second substrate, said second substrate engaged to said first substrate at said tilted angle to place said angle-polished end facet of said fiber to face said collimator lens.

37. The device as in claim 36, further comprising an adjustable optical attenuator located in an optical path of said add-channel beam before entering said second optical bandpass filter and operable to adjust a power level of said add-channel beam.

38. The device as in claim 37, wherein said adjustable optical attenuator includes an adjustable optical aperture.

39. The device as in claim 36, further comprising a base configured to support and mount said first and said second optical bandpass filters and said fiber ports.

40. The device as in claim 39, further comprising at least one optical reflector in an optical path of a beam, which is selected from said input optical signal, said add-channel beam, said drop-channel beam, and said second reflected optical beam, wherein said optical reflector is positioned to change a direction of said beam.

41. The device as in claim 36, further comprising a third optical bandpass filter operable to transmit light at said transmission wavelength and to reflect light at other wavelengths, said third optical bandpass filter positioned in an optical path of said first reflected optical beam between said first and said second optical bandpass filters to reflect and direct said first reflected optical beam to said second optical bandpass filter.

42. The device as in claim 26, wherein each fiber port includes a fiber fitting unit to engage a respective fiber with said tilted angle.

43. The device as in claim 42, wherein said fiber fitting unit includes a fiber sleeve that forms said tilted angle with respect to said collimator optic axis and holds said respective fiber.

44. The device as in claim 36, wherein each fiber port further comprises at least two ball members with different diameters positioned between and engaged to said first and said second substrates to tilt said second substrate at said tiled angle.

45. A device, comprising:
- a switching element to direct an optical signal beam to one or more switching directions;
- a fiber with an angle-polished end facet positioned to send said optical signal beam to or receive said optical signal beam from said switching element;
- a fiber coupler module holding said fiber and a collimator lens in an optical path between said angle-polished end facet and said switching element, wherein said fiber coupler module is configured to hold said fiber at a tilted angle with respect to a collimator optic axis of said collimator lens so that an output beam from said fiber is received and collimated by said collimator lens to propagate along said collimator optic axis, and wherein said fiber coupler module includes:
  - a receiving port to hold at least a portion of said collimator lens,
  - a first substrate fabricated to have a first groove to which said collimator lens is engaged, and
  - a second substrate fabricated to have a second groove to hold said fiber in parallel to said second substrate, said second substrate engaged to said first substrate at said tilted angle to place said angle-polished end facet of said fiber to face said collimator lens;
- an optical position sensor adopted to use an optical servo beam to measure a property of said switching element to produce a position signal indicative of a deviation between an actual switching direction and a desired switching direction of said signal beam; and
- a control unit to respond to said position signal to control said switching element so as to reduce said deviation to direct said signal beam substantially in said desired switching direction.

46. The device as in claim 45, wherein said fiber coupler module further comprises at least two ball members with different diameters positioned between and engaged to said first and said second substrates to tilt said second substrate at said tiled angle.

47. A device, comprising:
- a first array of switching elements and a second array of switching elements, each switching element operable to direct a signal beam from one direction to another direction, wherein each switching element in one of said first and said second arrays is operable to direct an incident beam to each and every switching element in another of said first and said second arrays;
- a first optical position sensor to use at least a first optical servo beam to measure a property of each switching element in said first array to produce a first position signal indicative of a deviation between an actual switching direction and a desired switching direction of a first signal beam received by said each switching element in said first array;
- a second optical position sensor to use at least a second optical servo beam to measure a property of each switching element in said second array to produce a second position signal indicative of a deviation between an actual switching direction and a desired switching direction of a second signal beam received by said each switching element in said second array,
wherein each switching element in said first array is operable to reduce said deviation to direct said first signal beam substantially in said desired switching direction, and wherein each switching element in said second array is operable to reduce said deviation to direct said second signal beam substantially in said desired switching direction;
- a first array of fiber ports positioned to optically communicate with said first array of switching elements and configured to hold fibers with angle-polished end facets respectively facing said first array of switching elements;
- a second array of fiber ports positioned to optically communicate with said second array of switching elements and configured to hold fibers with angle-polished end facets respectively facing said second array of switching elements, wherein each fiber port includes a collimator lens in an optical path between an angle-polished end facet of a respective fiber and a respective switching element and is configured to hold said respective fiber at a tilted angle with respect to a collimator optic axis of said collimator lens so that an output beam from said fiber is received and collimated by said collimator lens to propagate along said collimator optic axis, and wherein each fiber port includes:

a receiving port to hold at least a portion of said collimator lens, a first substrate fabricated to have a first groove to which said collimator lens is engaged, and a second substrate fabricated to have a second groove to hold said fiber in parallel to said second substrate, said second substrate engaged to said first substrate at said tilted angle to place said angle-polished end facet of said fiber to face said collimator lens.

48. The device as in claim 47, wherein each fiber port further comprises at least two ball members with different diameters positioned between and engaged to said first and said second substrates to tilt said second substrate at said tiled angle.

* * * * *